United States Patent
Suzuki et al.

(10) Patent No.: US 12,241,169 B2
(45) Date of Patent: Mar. 4, 2025

(54) ALKALINE WATER ELECTROLYZER

(71) Applicant: ASAHI KASEI KABUSHIKI KAISHA, Tokyo (JP)

(72) Inventors: Yusuke Suzuki, Tokyo (JP); Yousuke Uchino, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 564 days.

(21) Appl. No.: 17/597,898

(22) PCT Filed: Jun. 25, 2020

(86) PCT No.: PCT/JP2020/025098
§ 371 (c)(1),
(2) Date: Jan. 28, 2022

(87) PCT Pub. No.: WO2021/019986
PCT Pub. Date: Feb. 4, 2021

(65) Prior Publication Data
US 2022/0267915 A1 Aug. 25, 2022

(30) Foreign Application Priority Data
Jul. 30, 2019 (JP) .................................. 2019-140022

(51) Int. Cl.
*C25B 13/02* (2006.01)
*C25B 9/05* (2021.01)
(Continued)

(52) U.S. Cl.
CPC ................ *C25B 13/02* (2013.01); *C25B 9/05* (2021.01); *C25B 9/19* (2021.01); *C25B 9/63* (2021.01)

(58) Field of Classification Search
CPC .. C25B 13/02; C25B 9/05; C25B 9/19; C25B 9/63; C25B 1/04; C25B 9/23; C25B 9/60;
(Continued)

(56) References Cited

U.S. PATENT DOCUMENTS 4,654,134 A   3/1987   Morris et al.
4,892,632 A   1/1990   Morris
(Continued)

FOREIGN PATENT DOCUMENTS

EP   3351659 A1   7/2018
EP   3575439 A1   12/2019
(Continued)

OTHER PUBLICATIONS

Sep. 24, 2020, International Search Report issued in the International Patent Application No. PCT/JP2020/025098.
(Continued)

*Primary Examiner* — Jacob M Amick
*Assistant Examiner* — Charles J Brauch
(74) *Attorney, Agent, or Firm* — KENJA IP LAW PC

(57) ABSTRACT

An alkaline water electrolyzer includes at least two outer frames, a gasket, and a diaphragm. The at least two outer frames are stacked so as to overlap at least in part in a circumferential direction. The gasket is sandwiched between the two outer frames. The gasket can be in contact with the outer frames over the entire circumferential direction. In an inner peripheral surface of the gasket, a slit is formed along the circumferential direction. The gasket has a first protrusion portion. The first protrusion portion protrudes over the entire circumferential direction at a position overlapping the slit when viewed from a thickness direction of the slit. A diaphragm is caught in the slit of the gasket. A volume ratio
(Continued)

of volume of the first protrusion portion, to volume between a bottom of the slit and an end of the diaphragm, is between 0.5 and 100 inclusive.

16 Claims, 14 Drawing Sheets

(51) Int. Cl.
*C25B 9/19* (2021.01)
*C25B 9/63* (2021.01)

(58) Field of Classification Search
CPC . C25B 9/77; Y02E 60/36; F16J 15/121; F16J 15/104
See application file for complete search history.

(56) References Cited

U.S. PATENT DOCUMENTS

| | | |
|---|---|---|
| 7,790,305 B2 | 9/2010 | Heystek et al. |
| 2004/0128825 A1 | 7/2004 | Belchuk |
| 2013/0307227 A1 | 11/2013 | Ueda et al. |
| 2014/0197605 A1 | 7/2014 | Shimazoe et al. |
| 2016/0153100 A1* | 6/2016 | Nakagawa ................ C25B 9/77 204/252 |

FOREIGN PATENT DOCUMENTS

| | | |
|---|---|---|
| EP | 3604620 A1 | 2/2020 |
| JP | S52115781 A | 9/1977 |
| JP | 2012215291 A | 11/2012 |
| JP | 2019019408 A | 2/2019 |
| WO | 2014178317 A1 | 11/2014 |
| WO | 2017047792 A1 | 3/2017 |
| WO | 2018139616 A1 | 8/2018 |
| WO | 2018182005 A1 | 10/2018 |

OTHER PUBLICATIONS

Feb. 1, 2022, International Preliminary Report on Patentability issued in the International Patent Application No. PCT/JP2020/025098.
Jun. 6, 2023, the Supplementary European Search Report issued by the European Patent Office in the corresponding European Patent Application No. 20846007.1.

* cited by examiner

ALKALINE WATER ELECTROLYZER

CROSS-REFERENCE TO RELATED APPLICATION

This application claims priority to Japanese Patent Application No. 2019-140022, filed in Japan on Jul. 30, 2019, the entire disclosure of which is incorporated herein by reference.

TECHNICAL FIELD

The disclosure relates to an alkaline water electrolyzer.

BACKGROUND

In an alkaline water electrolyzer, a diaphragm and a gasket are disposed between electrolytic cells, for the purpose of preventing a short circuit between the stacked electrolytic cells and leakage of electrolytic solution and generated gas inside the electrolyzer. In particular, in the case of using a porous membrane as the diaphragm, a slit-type gasket is used in order to prevent leakage from an end of the diaphragm in a planar direction, and the gasket is disposed between the electrolytic cells in a state in which the diaphragm is inserted into the slit (see Patent Literature 1). When the slit-type gasket is used, the leakage from the end of the diaphragm in the planar direction can be broadly divided into out-of-tank leakage, which is leakage of the electrolytic solution and the generated gas to the outside through between the electrolytic cell and the gasket, and in-tank leakage, which is mixing of the generated gas between an anode and a cathode through the diaphragm and the gasket.

CITATION LIST

Patent Literature

PTL 1: WO 2014/178317 A1

SUMMARY

Technical Problem

In general, the higher the pressing surface pressure of the gasket, the more effectively the out-of-tank leakage and the in-tank leakage are prevented, but excessive pressing surface pressure leads to damage to the gasket and the diaphragm. Therefore, in order to prevent the out-of-tank leakage and the in-tank leakage, it is necessary to control the pressing surface pressure of the gasket within an appropriate range. In addition, the thinner the diaphragm is, the less resistance the diaphragm has and the higher the electrolysis efficiency, but the rupture strength of the diaphragm decreases. Therefore, it becomes more difficult to control the pressing surface pressure of the gasket.

It would be helpful to provide an alkaline water electrolyzer that reduces the possibility of out-of-tank leakage and in-tank leakage, while reducing damage to a gasket and a diaphragm.

Solution to Problem

The disclosure is as follows:

[1]
An alkaline water electrolyzer including:
at least two outer frames stacked so as to overlap at least in part in a circumferential direction;
a gasket sandwiched between the two outer frames, the gasket having a shape of a frame capable of being in contact with the outer frames over the entire circumferential direction, a slit being formed in an inner peripheral surface of the gasket along a circumferential direction, the gasket having a first protrusion portion that protrudes over the entire circumferential direction at a position overlapping the slit when viewed from a thickness direction of the slit; and
a diaphragm caught in the slit of the gasket, wherein
a volume ratio ($B_1/A_1$) of volume $B_1$ of the first protrusion portion to volume $A_1$ between a bottom of the slit and an end of the diaphragm, in a state of being released from being pressed in a thickness direction of the gasket, is between 0.5 and 100 inclusive.

[2]
The alkaline water electrolyzer according to [1], wherein a volume change ratio $\{(B_1-B_2)/B_1\}$ of volume $B_2$ of the first protrusion portion in a state of being sandwiched between the two outer frames, to the volume $B_1$ of the first protrusion portion in a state of being released from being sandwiched between the two outer frames, is between 0.5 and 1.0 inclusive.

[3]
The alkaline water electrolyzer according to [1], wherein a first volume change ratio $((A_1-A_2)/A_1)$ of volume $A_2$ between the bottom of the slit and the end of the diaphragm in a state of being sandwiched between the two outer frames, to the volume $A_1$ between the bottom of the slit and the end of the diaphragm in a state of being released from being sandwiched between the two outer frames, is between 0.5 and 1.0 inclusive.

[4]
The alkaline water electrolyzer according to [3], wherein a second volume change ratio $((B_1-B_2)/B_1)$ of volume $B_2$ of the first protrusion portion in a state of being sandwiched between the two outer frames, to the volume $B_1$ of the first protrusion portion in a state of being released from being sandwiched between the two outer frames, is between 0.5 and 1.0 inclusive.

[5]
The alkaline water electrolyzer according to [4], wherein a ratio $[(B_1-B_2)/B_1]/[(A_1-A_2)/A_1]$ of the second volume change ratio to the first volume change ratio is between 0.5 and 1.0 inclusive.

[6]
The alkaline water electrolyzer according to any one of [1] to [5], wherein the gasket has a second protrusion portion that protrudes at a position outside the slit when viewed from the thickness direction of the slit.

[7]
The alkaline water electrolyzer according to [6], wherein a volume change ratio $\{(C_1-C_2)/C_1\}$ of volume $C_2$ of the second protrusion portion in a state of being sandwiched between the two outer frames, to volume $C_1$ of the second protrusion portion in a state of being released from being sandwiched between the two outer frames, is between 0.5 and 1.0 inclusive.

[8]

The alkaline water electrolyzer according to any one of [1] to [7],
wherein
the outer frames each have a gas-liquid separation box including a wall portion that forms a same plane as a surface contacting the gasket in part in the circumferential direction, and
when a frame of the gasket is overlaid on the outer frames in the entire circumferential direction and the outer frames are pressed against the gasket at 2 MPa, an amount of deflection of the wall portion in the thickness direction of the gasket is 0.3 mm or less.

[9]

The alkaline water electrolyzer according to any one of [1] to [8],
wherein
one of the two outer frames has at least an anode that is in contact with the diaphragm, and
the other of the two outer frames has at least a cathode that is in contact with the diaphragm.

[10]

The alkaline water electrolyzer according to any one of [1] to [9], wherein a thickness of the gasket is more than 0.5 mm and 10 mm or less.

[11]

The alkaline water electrolyzer according to any one of [1] to [10], wherein a thickness of the slit is between 0.1 mm and 1 mm inclusive.

[12]

The alkaline water electrolyzer according to any one of [1] to [11], wherein the diaphragm is a porous membrane.

[13]

The alkaline water electrolyzer according to any one of [1] to [12], wherein a thickness of the diaphragm is between 0.1 mm and 1 mm inclusive.

[14]

The alkaline water electrolyzer according to any one of [1] to [13], wherein the gasket has, at least in part, a lock portion for at least one of the outer frames.

[15]

The alkaline water electrolyzer according to [14], wherein a width of the lock portion is larger than a length of the lock portion.

[16]

The alkaline water electrolyzer according to any one of [1] to [15],
wherein
pressing surface pressure of the gasket by the outer frames is between 1 MPa and 10 MPa inclusive, and
maximum contact surface pressure between the gasket and the diaphragm is between 3 MPa and 20 MPa inclusive.

Advantageous Effect

According to the disclosure, it is possible to provide an alkaline water electrolyzer that reduces the possibility of out-of-tank leakage and in-tank leakage, while reducing damage to a gasket and a diaphragm.

DETAILED DESCRIPTION

An embodiment of the disclosure will be described below in detail, but the disclosure is not limited to the following description, but may be implemented in various variations within the scope of the gist thereof.

(Electrolysis Apparatus for Alkaline Water Electrolysis)

Figure 1:
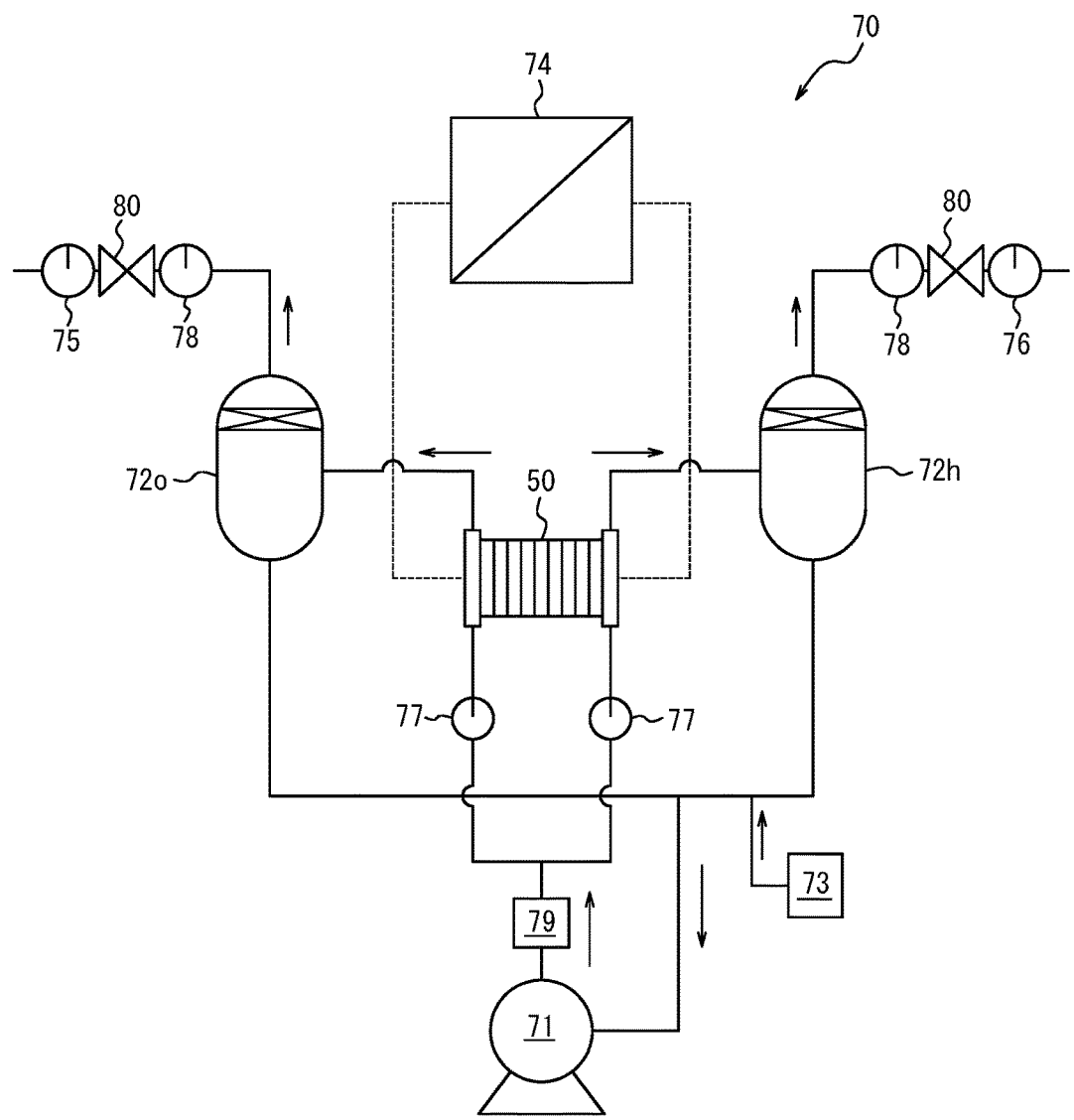
FIG. 1 is a schematic configuration diagram of an electrolysis apparatus for alkaline water electrolysis including an alkaline water electrolyzer according to an embodiment.

As illustrated in FIG. 1, an electrolysis apparatus 70 for alkaline water electrolysis including an alkaline water electrolyzer 50 of the present embodiment has a tubing pump 71, gas-liquid separation tanks 72h and 72o, a water replenisher 73, and the bipolar electrolyzer 50 for alkaline water electrolysis.

The tubing pump 71 boosts the pressure of an electrolytic solution stored in the gas-liquid separation tanks 72h and 72o and water supplied from the water replenisher 73, and supplies the electrolytic solution and the water to the alkaline water electrolyzer 50. By boosting the pressure of the tubing pump 71, the electrolytic solution is circulated. Flow meters 77 and a heat exchanger 79 are provided between the tubing pump 71 and the alkaline water electrolyzer 50. The flow meters 77 detect a flow rate of the electrolytic solution. The heat exchanger 79 heats the electrolytic solution by heat exchange.

The gas-liquid separation tanks 72h and 72o separate the electrolytic solution from gas by rising of the gas and a flow of the electrolytic solution. A pressure gauge 78 and a pressure control valve 80 are provided in a gas outlet path of each of the gas-liquid separation tanks 72h and 72o. The pressure control valve 80 opens and closes based on the value of pressure detected by the pressure gauge 78, to adjust the pressure in the outlet path. Outlet paths of electrolytic furnaces of the gas-liquid separation tanks 72h and 72o are connected to the tubing pump 71.

More specifically, a gas-liquid separation tank includes the oxygen separation tank 72o and the hydrogen separation tank 72h.

The oxygen separation tank 72h is connected to an anode chamber of the alkaline water electrolyzer 50, which will be described below, and separates the electrolytic solution and an oxygen gas discharged from the anode chamber. In the gas outlet path of the oxygen separation tank 72o, an oxygen concentration meter 75 is provided together with the pressure gauge 78 and the pressure control valve 80. The oxygen concentration meter 75 detects an oxygen concentration in the outlet path.

The hydrogen separation tank 72h is connected to a cathode chamber of the alkaline water electrolyzer 50, which will be described below, and separates the electrolytic solution and a hydrogen gas discharged from the cathode chamber. In the gas outlet path of the hydrogen separation tank 72h, a hydrogen concentration meter 76 is provided together with the pressure gauge 78 and the pressure control valve 80. The hydrogen concentration meter 76 detects a hydrogen concentration in the outlet path.

The water replenisher 73 replenishes water consumed by the electrolysis. Although the water replenished by the water replenisher 73 may be general tap water, it is preferable to use ion exchange water, RO water, ultrapure water, or the like in consideration of long-term operation.

The electrolysis apparatus 70 for alkaline water electrolysis generates oxygen and hydrogen by electrolysis of water based on electric power applied to the alkaline water electrolyzer 50 controlled by a rectifier 74. Further, the electrolysis apparatus 70 for alkaline water electrolysis supplies the generated oxygen and hydrogen separately through the gas-liquid separation tanks 72h and 72o.

(Alkaline Water Electrolyzer)

Next, a detailed configuration of the alkaline water electrolyzer will be described below. The electrolyzer for alkaline water electrolysis of the present embodiment may be a monopolar electrolyzer or a bipolar electrolyzer, and is preferably a bipolar electrolyzer including bipolar electrolytic cells for alkaline water electrolysis in which bipolar terminal elements are stacked via diaphragms.

The monopolar electrolyzer adopts a method for directly connecting one or more elements to a power source, and has a parallel circuit in which a cathode terminal element and an anode terminal element are provided across diaphragms to an anode and a cathode, respectively, of each element, which has the cathode and the anode arranged in parallel, and the power source is connected to each terminal element.

The bipolar electrolyzer adopts one of methods for connecting a large number of cells to a power source, in which multiple bipolar terminal elements each having an anode on one side and a cathode on the other side are arranged in the same orientation and connected in series, and only both ends are connected to the power source.

The bipolar electrolyzer has the feature that current of the power source can be reduced, and a compound, a predetermined substance, or the like can be manufactured in large quantities in a short time by electrolysis. Power source equipment for low current and high voltage is cheaper and more compact, if output is the same, so industrially, the bipolar electrolyzer is preferable to the monopolar electrolyzer.

Figure 2:
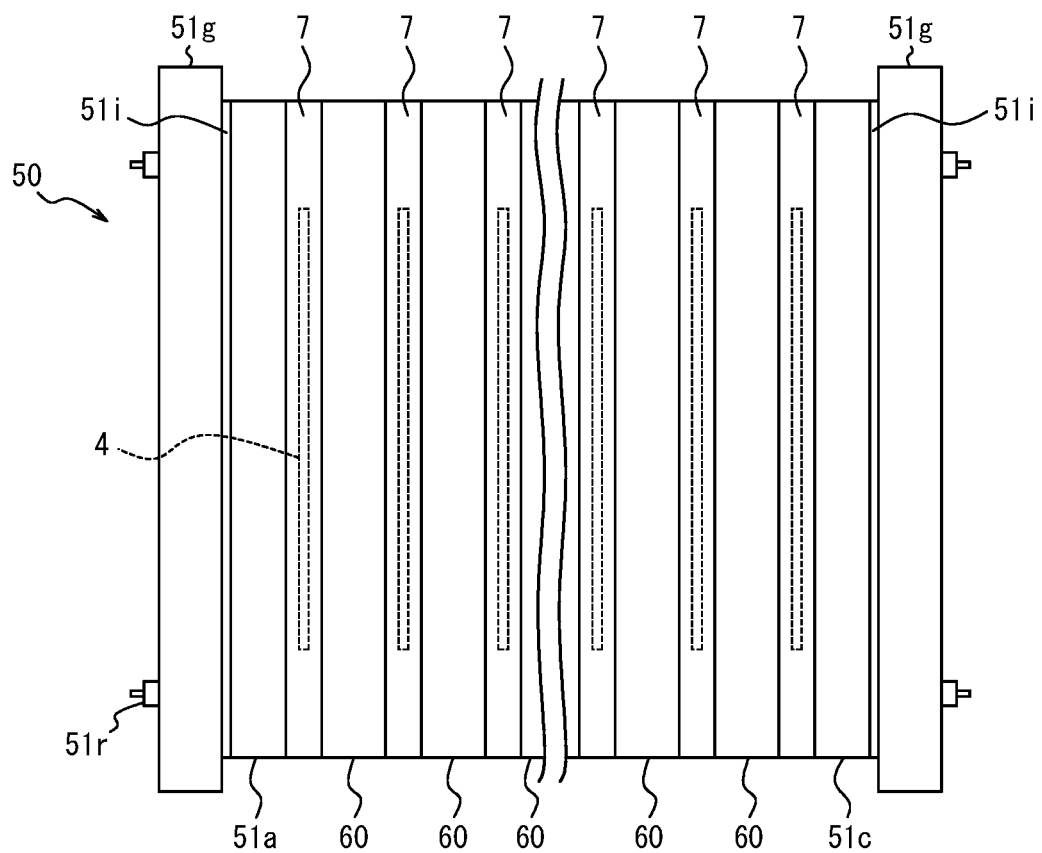
FIG. 2 is a side view that illustrates a schematic configuration of the alkaline water electrolyzer of FIG. 1.

As illustrated in FIG. 2, the alkaline water electrolyzer 50, which is a bipolar electrolyzer, has a plurality of bipolar terminal elements 60, a plurality of gaskets 7, a plurality of diaphragms 4, an anode terminal element 51a, and a cathode terminal element 51c. The bipolar terminal elements 60, the anode terminal element 51a, and the cathode terminal element 51c are hereinafter also referred to as elements, unless distinguished.

In the alkaline water electrolyzer 50, a laminate is configured by sandwiching the lined up and arranged bipolar terminal elements 60, the number of which is required for a designed production volume, between the anode terminal element 51a and the cathode terminal element 51c, while sandwiching the gaskets 7 between the adjacent two elements. In the alkaline water electrolyzer 50, each gasket 7 catches the diaphragm 4, as described below. The alkaline water electrolyzer 50 is formed by sandwiching the laminate between a fast head 51g and a loose head 51g from both ends along a lamination direction via insulating plates 51i, respectively, and integrally tightening the fast head 51g and the loose head 51g by a tightening mechanism such as tie rods 51r or a hydraulic cylinder system. In the alkaline water electrolyzer 50, the plurality of bipolar terminal elements 60 are arranged so that cathodes, which will be described later, face the side of the anode terminal element 51a.

It is preferable that the number of the bipolar terminal elements 60 be a number that includes 10 or more and 500 or less electrolytic cells constituted by components of the bipolar terminal elements 60, which will be described below. It is more preferable that the number of the bipolar terminal elements 60 be a number that includes 30 or more and 300 or less electrolytic cells. It is even more preferable that the number of the bipolar terminal elements 60 be a number that includes 50 or more and 200 or less electrolytic cells.

In particular, in a configuration in which the electrolytic cells are of an external header type, if the number of the overlapping electrolytic cells is 500 or less, leakage current is reduced and efficiency is increased. In addition, a sealing surface pressure is easily uniformed, and an electrolytic solution leakage and a gas leakage are less likely to occur. In addition, if the number of the electrolytic cells is 10 or more, a large amount of electric power can be stored, and it becomes possible to further function as an electric power storage system in effect.

Figure 3:
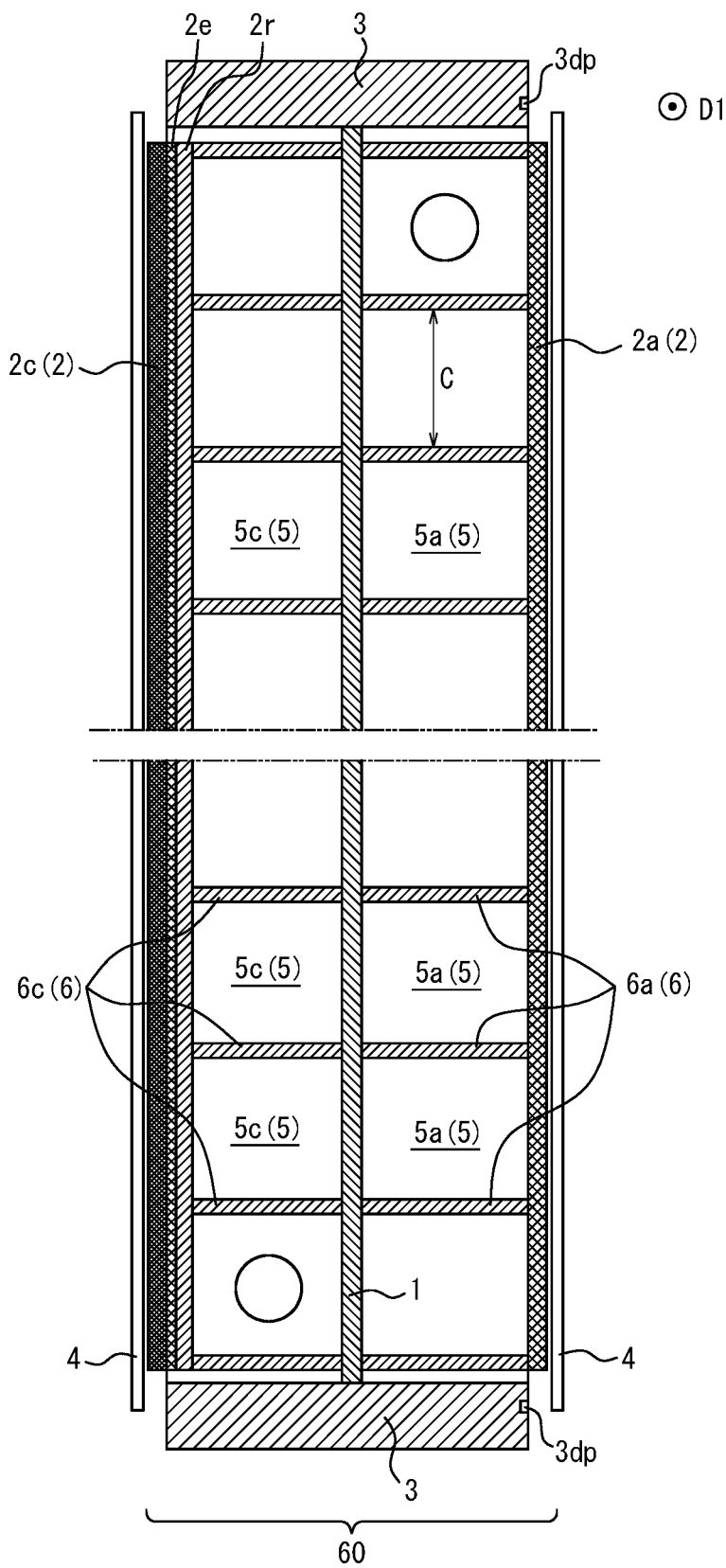
FIG. 3 is a cross sectional view of a structure of a bipolar terminal element of FIG. 2, cut in a plane perpendicular to a first direction.

As illustrated in FIG. 3, the bipolar terminal element 60 is provided with a partition wall 1, an outer frame 3, an anode 2a, and a cathode 2c. The bipolar terminal element 60 may also be provided with anode rectifier plates 6a, cathode rectifier plates 6c, a current collector 2r, and a conductive elastic body 2e. In the following, the "anode 2a" and the "cathode 2c" are referred to as "electrodes 2" unless distinguished. In the following, the "anode rectifier plates 6a" are also hereinafter referred to as "anode ribs 6a". In addition, "cathode rectifier plates 6c" are also hereinafter referred to as "cathode ribs 6c". The "anode rectifier plates 6a" and the "cathode rectifier plates 6c" are also hereinafter referred to as "rectifier plates 6" or "electrode ribs 6" unless distinguished.

—Partition Wall—

The shape of the partition wall 1 may be a plate-like shape having a predetermined thickness, but is not particularly limited. The plan view shape of the partition wall 1 may be an orthogon (square, rectangle, or the like) or a round (circle, ellipse, or the like), without being particularly limited, and the orthogon may have rounded corners.

The size of the partition wall 1 is not particularly limited, and may be designed appropriately according to the size of electrode chambers 5. The electrode chambers 5 are inner spaces defined by the partition wall 1, the outer frame 3, and the diaphragms 4. The "electrode chamber 5" on the side of the anode 2a is also hereinafter referred to as "anode chamber 5a" when distinguished. The "electrode chamber 5" on the side of the cathode 2c is also hereinafter referred to as "cathode chamber 5c" when distinguished.

When the partition wall 1 is a plate-like shape, the thickness of the partition wall 1 may be 0.5 mm to 5 mm, and the vertical length and the horizontal length thereof are not particularly limited. The thickness of the partition wall 1 need not be thick in a configuration in which the anode ribs 6a and the cathode ribs 6c are welded or otherwise joined to the partition wall 1 to form an integral structure, because the partition wall 1 is reinforced by the anode ribs 6a and the cathode ribs 6c. Usually, a thickness of 0.5 to 2 mm is sufficient. If the thickness is thinner than 0.5 mm, it is difficult to weld the anode ribs 6a and the cathode ribs 6c to the partition wall, and it is also difficult to handle in terms of manufacturing. If the thickness is thicker than 2 mm, it is undesirable because of increase in manufacturing cost and the weight of an electrolysis unit.

As the material of the partition wall 1, from the viewpoint of realizing uniform supply of electric power, a material having high electrical conductivity is preferable, and from the viewpoint of alkali resistance and heat resistance, nickel, nickel alloy, mild steel, and nickel plating on nickel alloy are preferable.

—Outer Frame—

The outer frame 3 frames the partition wall 1. The shape of the outer frame 3 is not particularly limited as long as the outer frame 3 can frame the partition wall 1, but may be a shape having an inner surface along a direction perpendicular to a plane of the partition wall 1 over an outer end of the partition wall 1. The shape of the outer frame 3 is not particularly limited, and may be suitably defined according to the plan view shape of the partition wall 1.

As for the dimensions of the outer frame 3, there is no particular limitation, and the dimensions may be designed according to the outer dimensions of the electrode chamber 5. The width of the outer frame 3 may be 10 mm to 40 mm, and preferably 15 mm to 30 mm. The extended length of the outer frame 3 is not particularly limited.

The partition wall 1 and the outer frame 3 may be integrated by welding or another joining method. For example, the partition wall 1 may be provided with flange portions protruding in both directions perpendicular to the plane of the partition wall 1, and the flange portions may compose part of the outer frame 3. In such a configuration, the length of the flange portions is not particularly limited, but may be 5 mm to 20 mm, and preferably 7.5 mm to 15 mm.

As a material of the outer frame 3, a material having high electrical conductivity is preferable, and from the viewpoint of alkali resistance and heat resistance, nickel, nickel alloy, mild steel, and nickel plating on nickel alloy are preferable.

Figure 4:
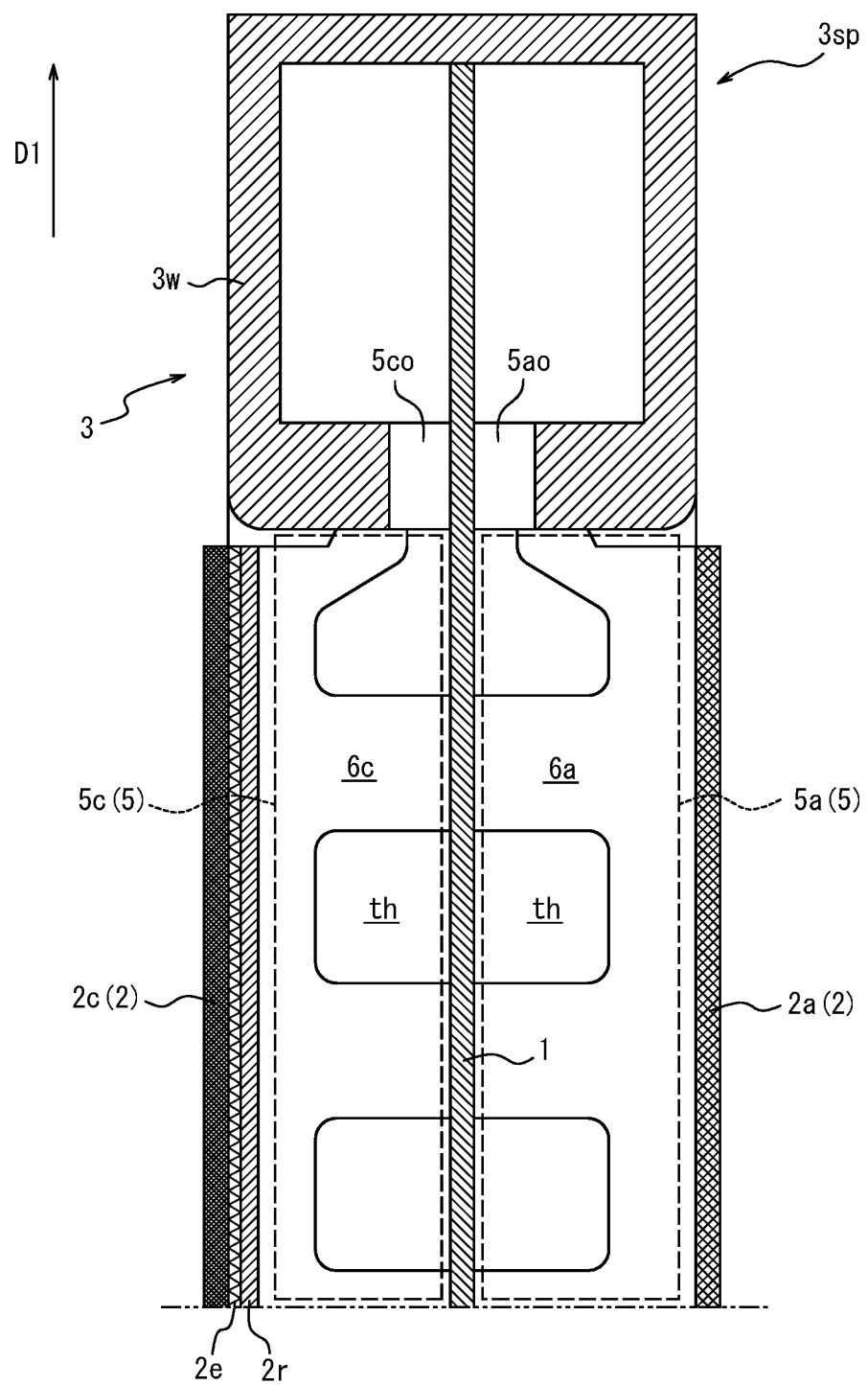
FIG. 4 is a partial cross sectional view of a structure of the bipolar terminal element of FIG. 2, cut in a plane parallel to the first direction, and illustrating the vicinity of an end on the side of the first direction.

As illustrated in FIG. 4, a gas-liquid separation box 3sp is provided in part of the outer frame 3 in a circumferential direction. The gas-liquid separation box 3sp includes a wall portion 3w that forms the same plane as a surface contacting the gasket 7 over the entire circumference of the outer frame 3. At a position of the outer frame 3 where the gas-liquid separation box 3sp is provided on the side of the anode 2a, an anode electrolytic solution outlet 5ao is drilled from an inner peripheral surface of the outer frame 3 to an outer peripheral surface thereof. At a position of the outer frame 3 where the gas-liquid separation box 3sp is provided on the side of the cathode 2c, a cathode electrolytic solution outlet 5co is drilled from the inner peripheral surface of the outer frame 3 to the outer peripheral surface thereof. The anode electrolytic solution outlet 5ao and the cathode electrolytic solution outlet 5co are hereinafter referred to as "electrolytic solution outlets 5o" unless distinguished.

The gas-liquid separation box 3sp may have an internal rib for the purpose of preventing the gas-liquid separation box 3sp from flexing due to a reaction force during stacking. The shape of the rib may be selected as appropriate so as not to disturb a flow of the electrolytic solution and the gas, and a plurality of ribs may be provided. It is preferable that the position of the rib be designed so as to suppress the amount of deflection of the gas-liquid separation box 3sp and not to obstruct the flow of the electrolytic solution and the gas. For example, for a gas-liquid separation box 3sp having a spacing of 90 mm from an inner surface (the side of the electrode chamber 5) to an outer surface, the rib may be provided at a position of 60 mm from the inner surface.

As illustrated in FIG. 3, in the outer frame 3, a recessed portion 3dp that is recessed in a direction perpendicular to the plane of the partition wall 1 may be formed. The recessed portion 3dp is engaged with a lock portion of the gasket 7, which will be described below. The recessed portion 3dp may be a groove continuous over the entire circumferential direction of the frame, or may be intermittent depressions. The recessed portion 3dp need not be formed in a configuration in which the lock portion of the gasket 7 engages with the outer or inner peripheral surface of the outer frame 3.

At least two of the outer frames 3 are stacked in the alkaline water electrolyzer 50 such that the outer frames 3 overlap each other at least in part in the circumferential direction of the frame.

—Electrodes—

The anode 2a and the cathode 2c are provided at positions across the partition wall 1. In hydrogen production by alkaline water electrolysis in the present embodiment, reduction of energy consumption, specifically, reduction of electrolysis voltage, is a major issue. The electrolysis voltage depends largely on the electrodes 2, the performance of both the electrodes 2 is important.

The electrolysis voltage in alkaline water electrolysis can be divided into overvoltage for anodic reaction (oxygen generation), overvoltage for cathodic reaction (hydrogen generation), and voltage depending on the distance between the electrodes 2 i.e. the anode 2a and the cathode 2c, in addition to theoretically required voltage for the electrolysis of water. Here, the overvoltage refers to voltage that needs to be applied excessively over a theoretical electrolysis potential when certain current is applied, and its value depends on the current value. When the same current is passed, power consumption can be reduced by using electrodes 2 with low overvoltage.

In order to realize the low overvoltage, the requirements of the electrodes 2 include high conductivity, high oxygen generation capacity (or hydrogen generation capacity), and high wettability of the electrolytic solution on surfaces of the electrodes 2.

As for the electrodes 2 for alkaline water electrolysis, the requirements of the electrodes 2, other than the requirements for the low overvoltage, include resistance to corrosion of substrates and catalyst layers of the electrodes 2, dropping of the catalyst layers, dissolution in the electrolytic solution, adhesion of contents to the diaphragm 4, and the like, even when unstable current such as renewable energy is used.

The size of the electrodes 2 is not particularly limited, but may be flatly defined in accordance with the size of each electrode chamber 5, which will be described later, and may be 0.4 m to 4.0 m in length, 0.4 m to 6.0 m in width, and 0.1 mm to 3 mm in thickness. Note that if the thickness of the electrodes 2 is too thin, the electrodes 2 may be deformed due to a pressure difference between the anode chamber 5a and the cathode chamber 5c or a pressing pressure. This may result in, for example, a fall of an end of the electrode 2, so the distance between the electrodes 2 may widen and the voltage may become high.

As for the electrodes 2 in the present embodiment, in order to increase surface areas used for electrolysis and to efficiently remove gas generated by electrolysis from the surfaces of the electrodes 2, it is preferable that at least one of the anode 2a and the cathode 2c be porous, and it is more preferable that the anode 2a and the cathode 2c be porous. In particular, in an electrolyzer having a zero-gap structure, which will be described later, since it is necessary to defoam gas generated from behind a surface in contact with the diaphragm, it is preferable that, in each electrode 2, the surface in contact with the diaphragm penetrate to a surface opposite thereto. Examples of a porous material include a plain weave mesh, a perforated metal, an expanded metal, a metal foam, and the like.

The electrodes 2 in the present embodiment may each be a substrate itself, or may each have a catalyst layer with high reaction activity on a surface of the substrate. However, it is preferable to use the one having the catalyst layer with high reaction activity on the surface of the substrate.

A material of the substrate is not particularly limited, but mild steel, stainless steel, nickel, or nickel-based alloy is preferred due to resistance to use environment. Furthermore, as the electrodes 2 that can be used for the zero-gap structure, electrodes 2 having thin wire diameters and small meshes are preferable because of flexibility. As such substrate material, a usually known material can be used. For example, as a substrate for the cathode 2c, nickel, nickel alloy, stainless steel, mild steel, or nickel plated on nickel alloy or stainless steel or mild steel can be used. The wire diameter of the substrate is preferably 0.05 mm to 0.5 mm, and its mesh opening is preferably in the range of 30 mesh to 80 mesh.

The catalyst layer of the anode 2a preferably has high oxygen generation capacity, and can be made of nickel, cobalt, iron, a platinum group element, or the like. These materials can form the catalyst layer as a single metal, a compound such as an oxide, a composite oxide or alloy composed of a plurality of metal elements, or a mixture thereof, in order to achieve desired activity and durability. More specifically, as materials that can form the catalyst layer of the anode 2a, there are nickel plating, alloy plating of nickel and cobalt, nickel and iron, and the like, composite oxides including nickel and cobalt such as $LaNiO_3$, $LaCoO_3$, $NiCo_2O_4$, and the like, compounds of platinum group elements such as iridium oxide, carbon materials such as graphene, and the like. The catalyst layer may include an organic material such as a polymer to improve durability and adhesion to the substrate.

The catalyst layer of the cathode 2c preferably has high hydrogen generation capacity, and can be made of nickel, cobalt, iron, a platinum group element or the like. These materials can form the catalyst layer as a single metal, a compound such as an oxide, a composite oxide or alloy composed of a plurality of metal elements, or a mixture thereof, in order to achieve desired activity and durability. More specifically, as materials that can form the catalyst layer of the cathode 2c, there are Raney nickel or other Raney alloys composed of a plurality of materials such as nickel and aluminum, or a nickel and tin, porous membranes prepared by a plasma spraying method using a nickel compound or a cobalt compound as a raw material, alloys and composite compounds of nickel and an element selected from cobalt, iron, molybdenum, silver, copper, and the like, metals and oxides of platinum group elements such as platinum and ruthenium, which have high hydrogen generation capacity, mixtures of a metal or oxide of these platinum group elements with a compound of other platinum group elements such as iridium and palladium or a compound of rare earth metals such as lanthanum and cerium, carbon materials such as graphene, and the like. In order to achieve high catalytic activity and durability, a plurality of the above materials may be stacked and a plurality may be mixed in the catalyst layer. The catalyst layer may include an organic material such as a polymeric material to improve durability and adhesion to the substrate.

If the thickness of the catalyst layer is too thick, electrical resistance may increase and the overvoltage may increase. On the other hand, if the thickness of the catalyst layer is too thin, the catalyst layer may dissolve or fall off due to prolonged electrolysis or cessation of electrolysis, resulting in deterioration of the electrodes 2 and increase in the overvoltage. For these reasons, the thickness of the catalyst layer is preferably between 0.2 µm and 1000 µm inclusive, and more preferably between 0.5 µm and 300 µm inclusive. The thickness of the catalyst layer can be measured, for example, by observing cross sections of the electrodes 2 with an electron microscope.

As a method of forming the catalyst layer on the substrate, there are a plating method, a thermal spraying method such as plasma spraying, a thermal decomposition method in which heat is applied after a precursor layer solution is applied to the substrate, a method in which a catalytic substance is mixed with a binder component and immobilized on the substrate, and a vacuum deposition method such as sputtering.

In the present embodiment, the specific surface area of each electrode 2 is preferably between 0.001 $m^2/g$ and 1 $m^2/g$ inclusive, and more preferably between 0.005 $m^2/g$ and 0.1 $m^2/g$ inclusive. If the specific surface area of the electrode 2 (the specific surface area of the entire electrode 2 including the substrate) is small, the number of reaction active points per unit area is reduced, and thus low overvoltage may not be obtained. On the other hand, if the specific surface area of the electrode 2 for water electrolysis is too large, the mechanical strength of the catalyst layer may be reduced and the durability may be decreased.

The specific surface area can be measured using the BET method, for example. A measurement sample is placed in a dedicated cell and pretreated by heating and vacuum evacuation to remove adsorbates on the pore surface beforehand. Then, adsorption/desorption isotherms of gas adsorption on the measurement sample are measured at −196° C. By analyzing the obtained adsorption/desorption isotherms by the BET method, the specific surface area of the measured sample can be obtained.

—Rectifier Plates—

In the bipolar electrolyzer 50 for alkaline water electrolysis of the present embodiment, the rectifier plates 6 are disposed, for example, approximately in parallel with a first direction D1 along the partition wall 1. The rectifier plates 6 reduce convection generated in the electrode chambers 5 by turbulence of gas-liquid flows in the anode chamber 5a and the cathode chamber 5c, thereby suppressing local increase in the temperature of the electrolytic solution. For example, as illustrated in FIG. 3, the plurality of rectifier plates 6 are provided at a certain interval (pitch) C in a direction perpendicular to the first direction D1 (in the example illustrated in the drawing, a direction of passage of the electrolytic solution) along the partition wall 1. For example, the rectifier plates 6 each have a length approximately equal to the height of the electrode chamber 5 and are provided perpendicular to the partition wall 1. The rectifier plates 6 have through holes th at a predetermined pitch in the first direction D1 for the purpose of, for example, reducing the weight of the electrolyzer, although this is not essential.

The rectifier plates 6 are preferably attached to the partition wall 1 and physically connected to the electrodes 2. According to such a configuration, the rectifier plates 6 serve as supports (ribs) for the electrodes 2, making it easy to maintain the zero-gap structure. It is also preferable that the rectifier plates 6 are electrically connected to the partition wall 1. In addition, the rectifier plates 6 can reduce convection generated in the electrode chambers 5 due to turbulence of gas-liquid flows in the electrode chambers 5, thereby suppressing local increase in the temperature of the electrolytic solution.

In such a configuration, the rectifier plates 6 may be provided with the electrodes 2, or the rectifier plates 6 may be provided with the current collector 2r, the conductive elastic body 2e, and the electrode 2 in this order. The above-described example of the bipolar electrolyzer 50 for alkaline water electrolysis adopts a structure in which, on the side of the cathode 2c, a cathode collector is configured, in which the cathode rectifier plates 6c, the current collector 2r, the conductive elastic body 2e, and the cathode 2c are overlaid in this order. On the side of the anode 2a, a structure in which the anode rectifier plates 6a and the anode 2a are overlaid in this order is adopted.

The above-described example of the bipolar electrolyzer 50 for alkaline water electrolysis adopts the structure in which the cathode collector is configured, in which the cathode rectifier plates 6c, the current collector 2r, the conductive elastic body 2e, and the cathode 2c are overlaid in order, on the side of the cathode 2c, and the structure in which the anode rectifier plates 6a and the anode 2a are overlaid in order is adopted on the side of the anode 2a, but the disclosure is not limited to this. On the side of the anode 2a, a structure in which an anode collector is configured, in which the anode rectifier plates 6a, the current collector 2r, the conductive elastic body 2e, and the anode 2a are overlaid, may also be adopted.

In detail, in the present embodiment, the rectifier plates 6 (the anode rectifier plates 6a and the cathode rectifier plates 6c) are attached to the partition wall 1.

It is more preferable that the rectifier plates 6 (the anode rectifier plates 6a or the cathode rectifier plates 6c) are provided not only with the role of supporting the anode 2a or cathode 2c but also with the role of transmitting electrical current from the partition wall 1 to the anode 2a or the cathode 2c.

In the bipolar electrolyzer 50 for alkaline water electrolysis of the present embodiment, it is preferable that at least a part of the rectifier plate 6 is electrically conductive, and it is even more preferable that the entire rectifier plate 6 is electrically conductive. According to such a configuration, it is possible to suppress increase in cell voltage due to deflection of the electrode 2.

That is, by arranging the conductive rectifier plates 6 at the predetermined intervals so as to support the electrodes 2, it is possible to prevent a phenomenon in which the electrodes 2 are flexed by pressing or by the pressure of the liquid and gas in the electrode chambers 5, and the zero-gap structure is locally impaired. In addition, the above configuration facilitates uniform transmission of electrical current to the electrodes 2, and makes it easy to maintain higher efficiency even in higher electric density operation.

The material of the rectifier plates 6 is determined in consideration of durability, strength, and the like in use environment. For example, a polymer material or a metal material can be used. It is possible to use a plurality of materials simultaneously. The polymer material is, for example, polysulfone, polyethersulfone, polyphenylsulfone, polyvinylidene fluoride, polycarbonate, tetrafluoroethylene perfluoroalkyl vinyl ether copolymer, tetrafluoroethylene ethylene copolymer, polyvinylidene fluoride, polytetrafluoroethylene, perfluorosulfonic acid, perfluorocarboxylic acid, polyethylene, polypropylene, polyphenylene sulfide, poly(para-phenylene benzobisoxazole), polyketone, polyimide, polyetherimide, or the like. Among these, polysulfone, polyethersulfone, polyphenylsulfone, polyphenylene sulfide, or polytetrafluoroethylene is preferred. As the metallic material, an electrically conductive metal is preferably used. For example, nickel-plated mild steel, stainless steel, nickel, and the like can be used. The material of the rectifier plate 6 is preferably the same material as that of the partition wall 1, in particular nickel is most preferred. These conductive metal materials can also be expected to contribute to reduction in conductivity resistance of the electrolytic cell.

In a configuration in which the plurality of rectifier plates 6 are arranged along one direction, the spacing between the adjacent rectifier plates 6 is determined in consideration of electrolysis pressure, a pressure difference in the electrode chambers 5, and the like.

The spacing C between the adjacent rectifier plates 6 is between 50 mm and 190 mm inclusive, more preferably between 50 mm and 150 mm inclusive, and even more preferably between 60 mm and 120 mm inclusive. If the spacing between the rectifier plates 6 is too narrow, it has the disadvantage of not only impeding the flow of the electrolytic solution and gas but also increasing cost. In a case in which the rectifier plates 6 are made to function as ribs connected to the electrodes 2, if the rib pitch is 50 mm or more, the gas can be released to a back surface of the electrodes 2. If the spacing is too wide, disadvantages such as deformation of the electrodes 2 held by a slight differential pressure between the anode chamber 5a and the cathode chamber 5c occur. If the rib pitch is 150 mm or less, the electrodes 2 are less likely to be deflected.

The rib pitch refers to a spacing (pitch) between the plurality of rectifier plates 6, if the plurality of rectifier plates 6 are provided at a fixed spacing (pitch), or an average of spacings between the plurality of rectifier plates 6 provided, if the plurality of rectifier plates 6 are not provided at a fixed spacing (pitch). In a case in which a spacing between the two rectifier plates 6 varies (is not constant) with respect to the direction of extension of the rectifier plates 6, the rib pitch may be an average of the spacing between the two adjacent rectifier plates 6.

The number of the rectifier plates 6, the length of the rectifier plates 6, the angle between each of the rectifier plates 6 and the partition wall 1, the number of the through holes th, and the spacing (pitch) of the through holes th in a given direction along the partition wall may be appropriately determined as long as the effects of the disclosure are obtained. A rib pitch of the anode rectifier plates 6a and a rib pitch of the cathode rectifier plates 6c may be the same or different. The rib pitch of the anode rectifier plates 6a and the rib pitch of the cathode rectifier plates 6c both satisfy the above ranges.

The length of the rectifier plates 6 may be appropriately determined according to the sizes of the electrode chambers 5 and the electrodes 2. The height of the rectifier plates 6 may be appropriately determined according to the distance to the end of the outer frame 3 in a direction perpendicular to the plane of the partition wall 1, the thickness of the gasket 7, the thickness of the electrodes 2, the distance between the anode 2a and the cathode 2c, and the like. The thickness of the rectifier plates 6 may be 0.5 mm to 5 mm in consideration of cost, fabrication, strength, and the like, and the rectifier plates 6 having a thickness of 1 mm to 2 mm are easy to use. However, the thickness is not particularly limited.

The rectifier plate 6 may be provided with the through holes th as appropriate, although it is not particularly limited. It is preferable to provide the through holes th at equal intervals in the extending direction of the rectifier plate 6. The plan view shape of the through holes th is not particularly limited, but may be either rectangular or circular, and may be, for example, a semicircular shape with a radius of 0.5 mm to 30 mm, and particularly a radius of 0.5 mm to 10 mm. The ratio of the area of the through holes th to the area of the rectifier plate 6 may be 5% to 95%, preferably 10% to 80%, and more preferably 20% to 60%. When the area of the through holes is 5% or more, passage of the electrolytic solution in a direction perpendicular to the first direction D1 in the tank is smoothed. When the area of the through holes th exceeds 95%, mechanical strength cannot be obtained, and the anode 5a and the cathode collector deform.

The rectifier plates 6 are usually used with being secured to the partition wall 1 by any attachment method. For example, a method of screw fixing, using an adhesive, or spot welding or laser welding in the case of the rectifier plates made of a metal material may be used. The rectifier plates 6 are secured to the partition wall 1 by means of spot welding, laser welding, or the like, as well as the anode 2a or the cathode 2c. Attachment of the electrode 2 or the current collector 2r to the rectifier plates 6 is also performed by the same method, or by tying and making the electrode 2 or the current collector 2r tight contact with the rectifier plates 6 using a wire or string-like member.

—Current Collector—

The current collector 2r includes, for example, a cathode current collector provided on the side of the cathode 2c and an anode current collector provided on the side of the anode 2a.

The current collector 2r transmits electricity to the conductive elastic body 2e and the electrode 2 stacked thereon, supports a load received from the conductive elastic body 2e and the electrode 2, and has the role of allowing gas generated from the electrode 2 to pass through to the side of the partition wall 1 without hindrance. Therefore, as for the shape of the current collector 2r, expanded metal, punched perforated plate, or the like is preferable. In this case, it is preferable that the aperture ratio of the current collector 2r be in a range in which the hydrogen gas generated from the electrode 2 can be extracted to the side of the partition wall 1 without hindrance. However, if the aperture ratio is too large, problems such as reduction in strength or reduction in conductivity to the conductive elastic body 2e may occur. If the aperture ratio is too small, gas releasing may become poor.

As a material of the current collector 2r, nickel, nickel alloy, stainless steel, mild steel, or the like can be used in terms of electrical conductivity and alkali resistance, but nickel or nickel plated on mild steel or stainless steel nickel alloy is preferred in terms of corrosion resistance. The current collector 2r is secured to the rectifier plate 6 by means of spot welding, laser welding, or the like.

—Conductive Elastic Body—

The conductive elastic body 2e is disposed between the current collector 2r and the electrode 2 and is in contact with the current collector 2r and the electrode 2. It is essential requirements that the conductive elastic body 2e transmits electricity to the electrode 2 and does not inhibit diffusion of gas generated from the electrode 2. The reason why the above is necessary requirements is that electrical resistance increases when the diffusion of the gas is inhibited, and electrolysis efficiency decreases when the area of the electrode 2 used for electrolysis decreases. The most important role is to tightly adhere the diaphragm 4 to the electrode 2 by evenly applying an appropriate pressure to the electrode 2 to the extent of not damaging the diaphragm 4.

As the conductive elastic body 2e, a normally known elastic body such as an elastic body composed of a wire can be used and, for example, a cushion mat in which woven nickel wires having a wire diameter of about 0.05 to 0.5 mm (preferably between 0.1 mm and 0.5 mm inclusive, more preferably between 0.12 mm and 0.35 mm inclusive) are corrugated is preferred because the cushion mat lowers the density of the conductive elastic body and makes it easy to maintain the zero-gap structure. A wire diameter is preferably between 0.1 mm and 0.5 mm inclusive, because it lowers the density of the conductive elastic material 2e and further facilitates suppressing increase in cell voltage.

Although a material of the conductive elastic body 2e is not limited, nickel or nickel plating on nickel alloy, stainless steel, or mild steel is preferable in terms of conductivity and alkali resistance.

The thickness of the conductive elastic body 2e is usually of the order of 1 mm to 20 mm.

The flexibility of the conductive elastic body 2e is in a known range. For example, the conductive elastic body 2e having such elasticity with a repulsive force of 30 g/cm$^2$ to 300 g/cm$^2$ at 50% compressive deformation can be used. Such a conductive elastic body 2e is used by being overlaid on the current collector 2r made of a conductive plate. As an attachment method thereof, an ordinarily known method can be used, and, for example, the conductive elastic body 2e is appropriately secured on the current collector 2r by spot welding, or using resin pins, metal wires, or the like. The repulsive force at 50% compressive deformation can be measured in accordance with JIS K6400. For example, a Shimadzu AGS-1kNX tabletop precision universal testing machine may be used under the condition of a compression test mode at room temperature and atmospheric pressure.

The electrode 2 may be directly overlaid on the conductive elastic body 2e, or the electrode 2 may be overlaid via another conductive sheet.

As for the conductivity of the conductive elastic body 2e, for example, electrical resistivity measured by a tester, a digital multimeter, or the like may be $1 \times 10^{-9}$ to $1 \times 10^{-5}$ Ωm.

In order to realize the zero-gap structure, the conductive elastic body 2e is secured to the electrode 2, preferably by spot welding, by fixing using metal or plastic pins, by pressing using the elasticity of the conductive elastic body 2e, or the like.

—Gasket—

As illustrated in FIG. 2, in the bipolar electrolyzer 50 for alkaline water electrolysis of the present embodiment, the gaskets 7 having the diaphragms 4 are each sandwiched between the outer frames 3 framing the partition walls 1. The gasket 7 is used to seal between the bipolar terminal element 60 and the diaphragm 4, and between the bipolar terminal elements 60 against the electrolytic solution and generated gas, and to prevent leakage of the electrolytic solution and the generated gas outside the electrolyzer and mixing of gas between the bipolar chambers.

Figure 5:
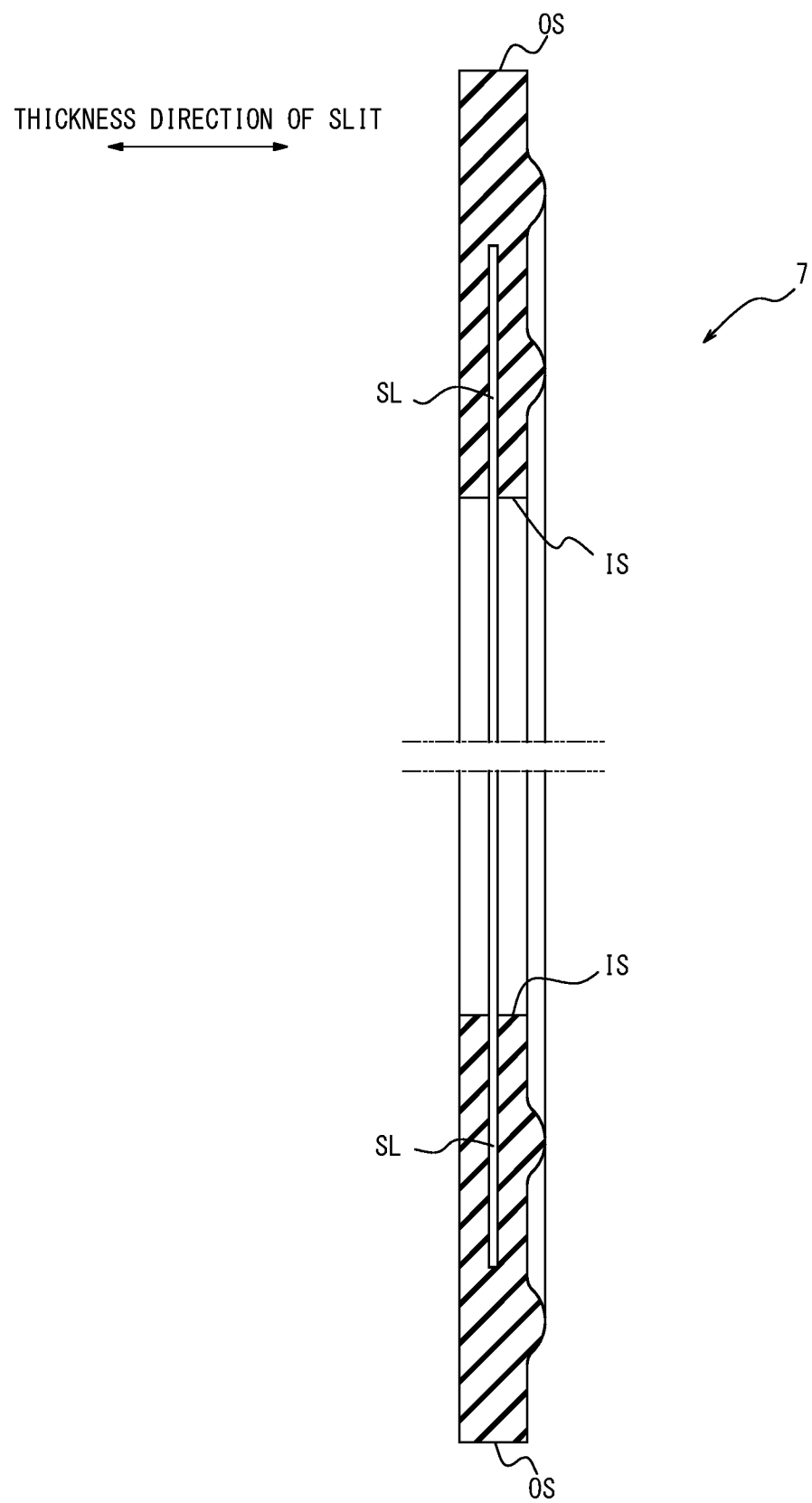
FIG. 5 is a cross sectional view illustrating a structure of a gasket of FIG. 2 along a thickness direction of a slit.

The gasket 7 is sandwiched between the respective outer frames 3 of the two elements adjacent to each other, and is in the shape of a frame that can be in contact with the outer frames 3 over the entire circumferential direction. As illustrated in FIG. 5, the gasket 7 has a slit SL formed along a circumferential direction in an inner peripheral surface IS. The gasket 7 contains an end portion of the diaphragm 4 in the slit SL and catches the diaphragm 4 by covering the end portion over the entire circumference of the diaphragm 4. Therefore, leakage of the electrolytic solution or gas from the end of the diaphragm 4 can be prevented more reliably.

The gasket 7 is provided with a first protrusion portion $7p1$ protruding in at least one direction in the thickness direction of the slit SL. Further, the gasket 7 is preferably provided with a second protrusion portion $7p2$. In the following description, the first protrusion portion $7p1$ and the second protrusion portion $7p2$ are referred to as "protrusion portions $7p$" unless distinguished. The protrusion portions $7p$ are provided over the entire circumferential direction of the frame and may be ridged. The first protrusion portion $7p1$ may be formed at a position overlapping the slit SL when viewed from the thickness direction of the slit SL. Further, the second protrusion portion $7p2$ may be formed at a position that is outside the slit SL when viewed from the thickness direction of the slit SL.

By providing the protrusion portions $7p$, the protrusion portions $7p$ are locally pressed during stacking, and the diaphragm 4 contained in the slit SL is pressed by the gasket 7 at the positions corresponding to the protrusion portions $7p$. Therefore, the gasket 7 can hold the diaphragm 4 more firmly, and it is easier to prevent leakage of the electrolytic solution or gas.

Further, it is preferable that the gasket 7 have a lock portion, which is to be engaged with the outer frame 3, at least in part between inner and outer ends of a frame. The lock portion protrudes in at least one direction in the thickness direction of the gasket 7. The lock portion may be a ridged shape that is continuous along the circumferential direction of the frame, or a projecting shape that is intermittent along the circumferential direction of the frame. The lock portion can secure the position of the gasket 7 relative to the outer frame 3 and can prevent misalignment due to deformation of the gasket 7.

Figure 6:
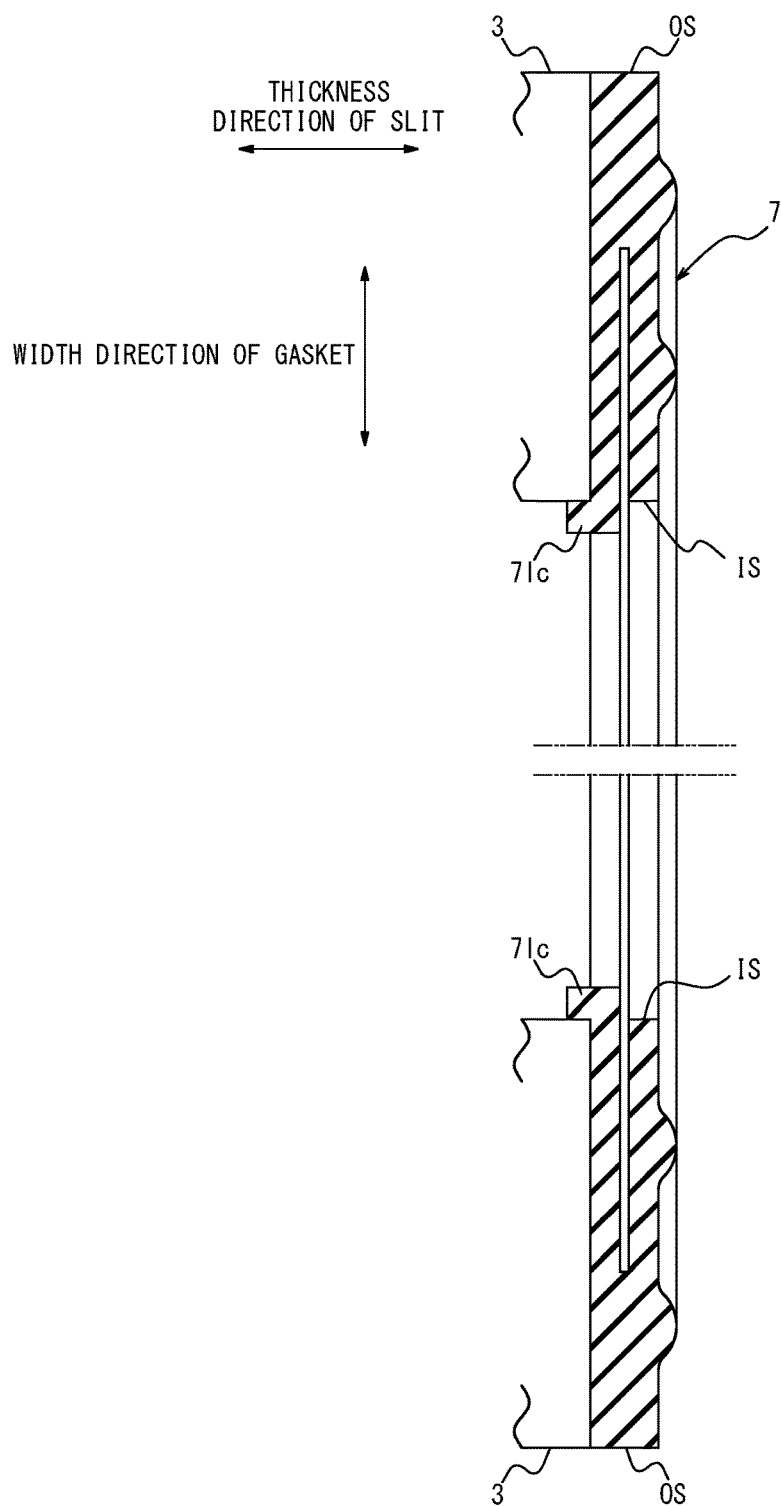
FIG. 6 is a cross sectional view illustrating an example of the gasket of FIG. 2 having a lock portion, along the thickness direction of the slit.
Figure 7:
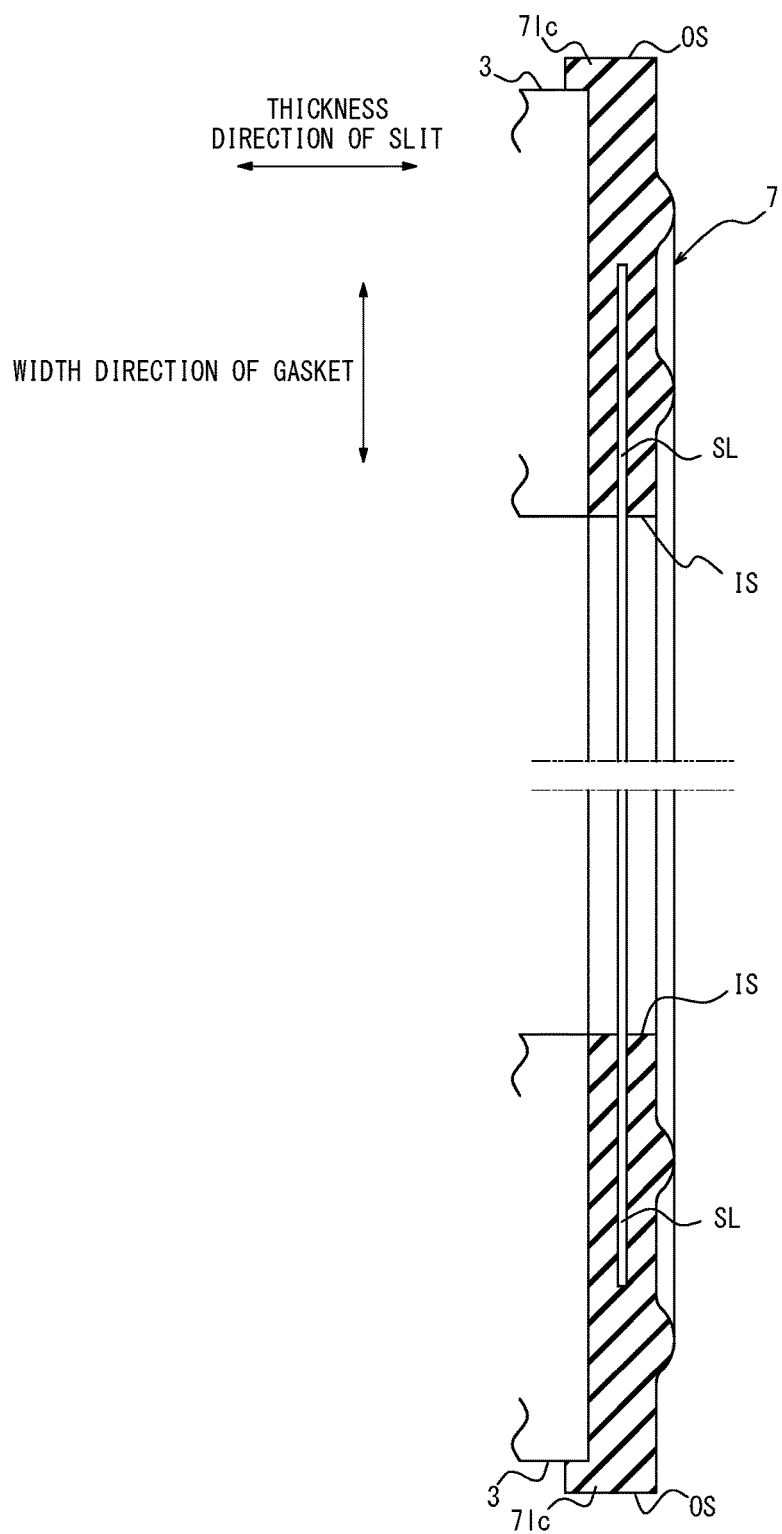
FIG. 7 is a cross sectional view illustrating another example of the gasket of FIG. 2 having a lock portion, along the thickness direction of the slit.
Figure 8:
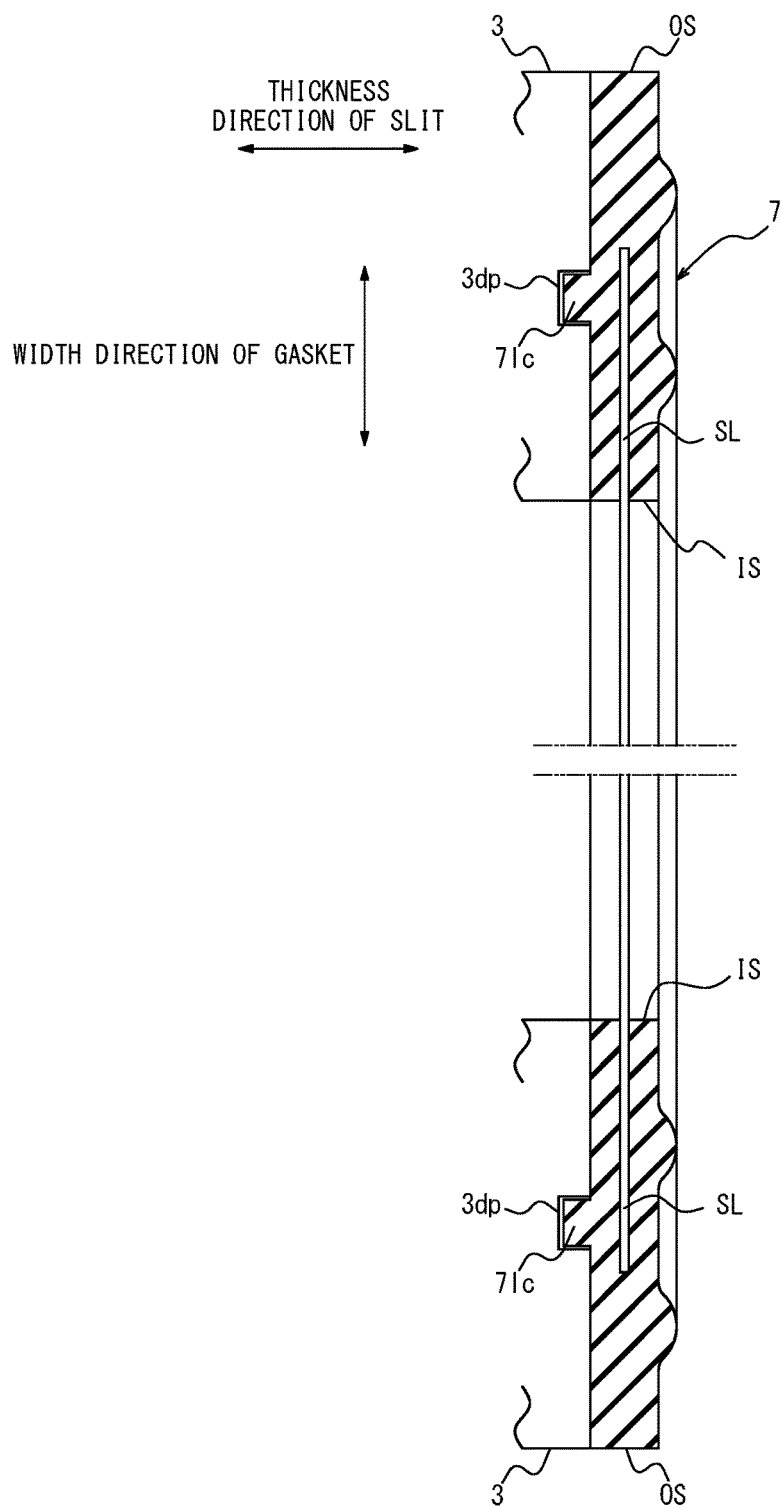
FIG. 8 is a cross sectional view illustrating another example of the gasket of FIG. 2 having a lock portion, along the thickness direction of the slit.

The lock portion can be provided at any position depending on its purpose. For example, as illustrated in FIG. 6, for the purpose of preventing outward misalignment in a width direction of the gasket 7, a lock portion $71c$ may be provided on the side of the inner peripheral surface IS of the gasket 7 so as to be engaged with the inner peripheral surface of the outer frame 3. Also, for example, as illustrated in FIG. 7, for the purpose of preventing inward misalignment in the width direction of the gasket 7, a lock portion $71c$ may be provided on the side of an outer peripheral surface OS of the gasket 7 so as to be engaged with the outer peripheral surface of the outer frame 3. Also, for example, as illustrated in FIG. 8, in the width direction of the gasket 7, for the purpose of securing an installation position of the gasket 7 relative to the outer frame 3, a lock portion $71c$ may be provided at a position opposite the recessed portion $3dp$ of the outer frame 3 in a shape capable of engaging with the recessed portion $3dp$.

By providing the lock portion $71c$, the gasket 7 can be installed at an intended position with respect to the outer frame 3, and it is easier to prevent the gasket 7 from shifting and being subjected to excessive pressure. In addition, it is easy to prevent the gasket 7 from protruding from the outer frame 3 due to change in the volume of the gasket 7 caused by a temperature cycle or change in pressure caused by variation in internal pressure of the cell. Further, the above effect can be enhanced by increase in the bending moment of the lock portion $71c$ and increase in contact area with the outer frame 3. As examples of a method therefor, the width of the lock portion $71c$ is increased, and the curvature of the corners of the lock portion $71c$ is increased.

Although the width of the lock portion $71c$ is not particularly limited, the above effect can be enhanced by making the width of the lock portion $71c$ the same as or larger than the length of the lock portion $71c$. Here, the width of the lock portion $71c$ refers to a maximum width of a portion that is engaged with the outer frame 3 in the width direction of the gasket 7. On the other hand, the length of the lock portion $71c$ refers to a maximum length from a surface of the gasket 7 along the thickness direction of the gasket 7.

Although the width of the lock portion $71c$ is not particularly limited, the width of the lock portion $71c$ is preferably between 1 mm and 10 mm inclusive, and more preferably between 2 mm and 5 mm inclusive. When the width of the lock portion $71c$ is within the above range, the lock portion $71c$ is less likely to be cut against overhang of the gasket 7. From the same viewpoint, the length of the lock portion $71c$ is preferably between 1 mm and 10 mm inclusive, and more preferably between 2 mm and 5 mm inclusive. Further, in order to efficiently demonstrate the effect of the lock portion $71c$, the width of the lock portion $71c$ is preferably between 1.0 and 10 times, inclusive, as thick as the length of the lock portion $71c$, more preferably between 1.0 and 5.0 times, inclusive, and even more preferably between 1.0 and 3.0 times, inclusive. When the width of the lock portion $71c$ relative to the length of the lock portion $71c$ is within the above range, the bending moment of the lock portion $71c$ can be designed to be sufficiently high, and interference with other components such as the electrodes 2 can be suppressed.

A material of the gasket 7 is not particularly limited, and any known rubber material, resin material, or the like having insulating property can be selected. As the rubber material or resin material, specifically, a rubber material such as natural rubber (NR), styrene-butadiene rubber (SBR), chloroprene rubber (CR), butadiene rubber (BR), acrylonitrile-butadiene rubber (NBR), silicone rubber (SR), ethylene propylene rubber (EPT), ethylene-propylene-diene rubber (EPDM), fluoroelastomer (FR), isobutylene-isoprene rubber (IIR), urethane rubber (UR), or chlorosulfonated polyethylene rubber (CSM), a fluoropolymer material such as polytetrafluoroethylene (PTFE), tetrafluoroethylene perfluoroalkyl vinyl ether copolymer (PFA), tetrafluoroethylene ethylene copolymer (ETFE), or chlorotrifluoroethylene ethylene copolymer (ECTFE), or a resin material such as polyphenylene sulfide (PPS), polyethylene, polyimide, or polyacetal can be used. Among these, ethylene-propylene-diene rubber (EPDM) or fluoroelastomer (FR) is particularly suitable from the viewpoint of elastic modulus and alkali resistance.

A reinforcing material may be embedded in the gasket 7. This can prevent the gasket 7 from being crushed when the gasket 7 is pressed between the outer frames 3 during stacking, thereby making it easier to prevent damage.

As the reinforcing material, a known metal material, resin material, carbon material, or the like can be used. Specifically, metal such as nickel or stainless steel, resin such as nylon, polypropylene, PVDF, PTFE or PPS, and a carbon material such as carbon particles or carbon fibers can be mentioned.

As the shape of the reinforcing material, a woven fabric, a non-woven fabric, a short fiber, a porous membrane, or the like is suitable. Furthermore, a protective layer may be provided on a surface of the gasket 7. This can also improve adhesion between the gasket 7 and the element and improve the alkali resistance of the gasket 7. A material of such a protective layer may also be selected from among the materials for the gasket 7.

The size of the gasket 7 is not particularly limited and may be designed to match the dimensions of the electrode chambers 5 and the diaphragm 4.

The thickness of the gasket 7 is not particularly limited, but is designed according to the material, elastic modulus, and cell area of the gasket 7. As a preferred range of the thickness, the thickness is preferably between 0.5 mm and 10 mm inclusive, more preferably between 1.0 mm and 10 mm inclusive, and even more preferably between 3.0 mm and 10 mm inclusive.

The thickness of the slit SL is not particularly limited, but is designed according to the thickness of the diaphragm 4 and the like. A preferred range of the thickness is between 0.1 mm and 1 mm inclusive. The depth of the slit SL from the inner peripheral surface IS is preferably such that, when the end portion of the diaphragm 4 is contained over the entire circumference in a state before assembly of the alkaline water electrolyzer 50, a void is created between the end of the diaphragm 4 and the bottom of the slit SL. Note that, the state of the gasket 7 before assembly of the alkaline water electrolyzer 50 is regarded to be approximately equal to a state of the gasket 7 after being released from being sandwiched, in other words, pressing by the outer frames 3 in the alkaline water electrolyzer 50 after assembly.

The height of the protrusion portions 7p in a state before assembly of the alkaline water electrolyzer 50 is not particularly limited, but it is preferable to be 0.5 mm to 5 mm in order to develop sufficient pressing pressure. The volume B1 of the first protrusion portion 7p1 needs to satisfy a volume ratio (B1/A1) of the volume B1 to the volume A1 of the void in the slit SL between the end of the diaphragm 4 and the bottom of the slit SL in the gasket 7 having the diaphragm 4 contained in the slit SL, in the state before assembly of the alkaline water electrolyzer 50, of between 0.5 and 100 inclusive. The volume A1 of the void between the end of the diaphragm 4 to the bottom of the slit SL and the volume B1 of the first protrusion 7p1 in the state before assembly of the alkaline water electrolyzer 50 can be measured by a method, which will be described in the examples below.

The elastic modulus of the gasket 7 is not particularly limited and is designed according to the material of the electrodes 2 and the cell area. As a range of the preferred elastic modulus, a tensile stress of 0.20 MPa to 20 MPa is preferable at 100% deformation, and a tensile stress of 0.5 MPa to 15 MPa is more preferable and a tensile stress of 1.0 MPa to 10 MPa is even more preferable from the viewpoint of sealing characteristics and cell strength during stacking. The tensile stress can be measured in accordance with JIS K6251. For example, Autograph AG manufactured by Shimadzu Corporation may be used.

In the present embodiment, it is preferable that the thickness of the gasket 7 be 0.5 mm to 10 mm and that the tensile stress of the gasket 7 be from 1.0 MPa to 10 MPa at 100% deformation, from the viewpoint of suppressing increase in cell voltage due to electrode deflection and from the viewpoint of sealing characteristics and cell strength during stacking. It is also preferable that compressive strain of the gasket 7 be between 10% and 40% inclusive, when the gasket 7 is pressed at 2 MPa.

An adhesive may be used to attach the gasket 7 to the bipolar terminal element 60. The adhesive may be applied to one side of the gasket 7 to glue the gasket 7 to the outer frame 3 on one side of the element. After drying the adhesive, it is preferable to apply water to the surfaces of the electrodes 2 of the bipolar terminal element 60 to moisten the electrodes 2. In the gasket 7 provided with the slit SL to contain the end portion of the diaphragm 4 so that the diaphragm 4 can be retained, the gasket 7 may be glued with the diaphragm 4 retained, or the diaphragm 4 may be retained after the gasket 7 is glued.

—Diaphragm—

In the bipolar electrolyzer 50 for alkaline water electrolysis of the present embodiment, the diaphragm 4 is caught in the slit SL of the gasket 7, as described above. As the diaphragm 4, an ion-permeable membrane is used to isolate the generated hydrogen gas and oxygen gas while conducting ions.

As the ion-permeable diaphragm 4, an ion-exchange membrane having an ion exchange capacity and a porous membrane capable of permeating the electrolytic solution can be used. As this ion-permeable diaphragm 4, a membrane having low gas permeability, high ionic conductivity, low electronic conductivity, and high strength is preferable.

The tensile rupture strength of the diaphragm 4 is preferably 10 MPa or more from the viewpoint of preventing rupture of a portion caught by the gasket 7. The tensile rupture strength of the diaphragm 4 is preferably 40 MPa or less.

The size of the diaphragm 4 is not particularly limited, as long as the entire end portion of the diaphragm 4 is contained in the slit SL, and may be designed according to the dimensions of the slit SL. Although the thickness of the diaphragm 4 is not particularly limited, the thickness of the diaphragm 4 is preferably between 0.1 mm and 1 mm inclusive.

——Porous Membrane——

The porous membrane has a structure with a plurality of fine through holes that allow the electrolytic solution to permeate through the diaphragm 4. Since ionic conduction occurs when the electrolytic solution permeates the porous membrane, it is very important to control the porous structure such as a pore diameter, porosity, and hydrophilicity. On the other hand, not only the electrolytic solution but also the generated gas must be prevented from passing through the membrane, i.e., the membrane must have gas barrier properties. From this viewpoint, it is also important to control the porous structure.

The porous membrane has a plurality of fine through holes. The porous membrane includes a polymeric porous membrane, an inorganic porous membrane, a woven fabric, a non-woven fabric, and the like. These can be fabricated by known techniques.

The porous membrane preferably includes a polymer material and hydrophilic inorganic particles, and the presence of the hydrophilic inorganic particles can impart hydrophilicity to the porous membrane.

——Polymer Material——

The polymeric material includes, for example, polysulfone, polyethersulfone, polyphenylsulfone, polyvinylidene fluoride, polycarbonate, tetrafluoroethylene perfluoroalkyl vinyl ether copolymer, tetrafluoroethylene ethylene copolymer, polyvinylidene fluoride, polytetrafluoroethylene, perfluorosulfonic acid, perfluorocarboxylic acid, polyethylene, polypropylene, polyphenylene sulfide, poly (para-phenylene benzobisoxazole), polyketone, polyimide, polyetherimide, or the like. Among these, polysulfone, polyethersulfone, polyphenylsulfone, polyphenylene sulfide, or polytetrafluoroethylene is preferable, and polysulfone is more preferable. These may be used alone, or two or more may be used in combination.

By using polysulfone, polyethersulfone, or polyphenylsulfone as the polymer material, resistance to alkaline solution of high temperature and high concentration is further improved. In addition, by using, for example, a non-solvent-induced phase separation method or the like, the diaphragm 4 can be formed more easily. In particular, when polysulfone is used, the pore diameter can be controlled more precisely.

The pore diameter of the porous membrane is preferably controlled in order to obtain appropriate membrane properties such as separation capacity and strength. When used in alkaline water electrolysis, it is preferable to control the pore diameter of the porous membrane from the viewpoint of preventing mixing of the oxygen gas generated from the anode 2a and the hydrogen gas generated from the cathode 2c and reducing voltage loss in electrolysis.

The larger the average pore diameter of the porous membrane, the larger the amount of permeability of the porous membrane per unit area, and in particular, the better the ion permeability of the porous membrane in electrolysis, which tends to reduce voltage loss. In addition, the larger the average pore diameter of the porous membrane, the smaller the surface area in contact with alkaline water, which tends to suppress degradation of the polymer. On the other hand, the smaller the average pore diameter of the porous membrane, the higher the separation accuracy of the porous membrane, which tends to improve gas barrier property of the porous membrane in electrolysis. Furthermore, when hydrophilic inorganic particles with a small particle diameter, which will be described later, are supported on the porous membrane, the hydrophilic inorganic particles can be firmly retained without being chipped off. Therefore, the porous membrane can be provided with high retention capacity of the hydrophilic inorganic particles, and maintain its effect over a long period of time.

It is preferable that a maximum pore diameter of the porous membrane be controlled in order to improve the separation accuracy of the porous membrane. Specifically, the smaller the difference between the average pore diameter and the maximum pore diameter, the higher the separation performance of the porous membrane tends to be. In particular, in electrolysis, since variations of the pore diameter in the porous membrane can be kept small, the possibility of decrease in the purity of the gas generated from both electrode chambers 5, due to the occurrence of pinholes, can be reduced.

The average water permeable pore diameter (average pore diameter) of the above porous membrane is preferably between 0.01 μm and 1.0 μm inclusive, and more preferably between 0.1 μm and 0.5 μm inclusive. When the average permeable pore diameter is 0.01 μm or more, the pores are hardly blocked and clogged by impurities. When the diameter is 1.0 μm or less, gas barrier property is excellent.

From such a viewpoint, in the porous membrane of the present embodiment, the average pore diameter is preferably between 0.01 μm and 1.0 μm inclusive, and/or the maximum pore diameter is more than 0.01 μm and 2.0 or less. When the pore diameter is in this range, the porous membrane can achieve both excellent gas barrier property and high ion permeability.

It is preferable that the pore diameter of the porous membrane be controlled in an actually used temperature range. Thus, for example, when the porous membrane is used as the diaphragm 4 for electrolysis in environment of 90° C., it is preferable to satisfy the above range of the pore diameter at 90° C. As a range in which the porous membrane, as the diaphragm 4 for alkaline water electrolysis, can exhibit more superior gas barrier property and high ion permeability, the porous membrane preferably has an average pore diameter of between 0.01 μm and 0.5 μm inclusive and/or a maximum pore diameter of between 0.5 μm and 1.8 μm inclusive, and more preferably has an average pore diameter of between 0.01 μm and 0.5 μm inclusive and/or a maximum pore diameter of between 0.05 μm and 1.8 μm inclusive.

The average pore diameter and maximum pore diameter for permeation of the porous membrane can be measured by the following method.

The average pore diameter for permeation of the porous membrane refers to an average permeable pore diameter measured by the following method using an integrity tester ("Sartocheck Junior BP-Plus" manufactured by Sartorius Stedim Japan). First, the porous membrane is cut out to a predetermined size, including the core material, and this is used as a sample. This sample is set in any pressure-resistant container, and the container is filled with pure water. Next, the pressure-resistant container is held in a thermostatic bath set at a predetermined temperature, and the measurement is started after the inside of the pressure-resistant container reaches the predetermined temperature. When the measurement starts, an upper side of the sample is pressurized with nitrogen, and the numerical values of pressure and permeation flow rate are recorded as the pure water permeates through from a lower side of the sample. The average permeable pore diameter can be determined from the following Hagen-Poiseuille equation using a gradient between pressure and permeation flow rate at pressure between 10 kPa and 30 kPa.

$$\text{Average permeable pore diameter (m)} = \{32\eta L\mu_0/(\varepsilon P)\}^{0.5}$$

where η represents the viscosity (Pa·S) of water, L represents the thickness (m) of the porous membrane, $\mu_0$ to represents apparent flow velocity and $\mu_0$ to (m/s)=flow rate (m³/s)/channel area (m³). ε is a void ratio, and P is pressure (Pa).

The maximum pore diameter of the porous membrane can be measured using a completeness tester ("Sartocheck Junior BP-Plus" manufactured by Sartorius Stedim Japan) by the following method. First, the porous membrane is cut out to a predetermined size, including the core material, and this is used as a sample. This sample is wetted with pure water to impregnate pores of the porous membrane with the pure water, and set the sample in a pressure-resistant container for measurement. Next, the pressure-resistant container is held in a thermostatic bath set at a predetermined temperature, and the measurement is started after the inside of the pressure-resistant container reaches the predetermined temperature. When the measurement starts, an upper side of the sample is pressurized with nitrogen, and nitrogen pressure when bubbles are continuously generated from a lower side of the sample is defined as bubble point pressure. The maximum pore diameter can be determined from the following bubble point formula, which is a variation of the Young-Laplace formula.

Maximum pore diameter (m)=4γ cos θ/P where γ represents the surface tension (N/m) of water, cos θ is a contact angle (rad) between a porous membrane surface and water, and P represents the bubble point pressure (Pa).

In the diaphragm 4 for alkaline water electrolysis, it is preferable to control the porosity of the porous membrane from the viewpoints of achieving gas barrier property, maintenance of hydrophilicity, prevention of decrease in ion permeability due to adhesion of bubbles, and furthermore obtaining stable electrolysis performance (low voltage loss or the like) for a long time.

From the viewpoint of achieving both gas barrier property and low voltage loss at a high level, a lower limit of the porosity of the porous membrane is preferably 30% or more, more preferably 35% or more, and even more preferably 40% or more. An upper limit of the porosity is preferably 70% or less, more preferably 65% or less, further more preferably 60% or less, and even more preferably 55% or less. The porosity of the porous membrane is preferably between 30% and 70% inclusive. When the porosity of the porous membrane is equal to or more than the above-described lower limit, the cell voltage can be lowered. When the porosity is equal to or less than the above upper limit, the gas barrier property and mechanical strength become good and the porous membrane is not easily deformed. In addition, gaps are less likely to form and the pores in the porous membrane are less likely to collapse even after long-term use. When the porosity of the porous membrane is equal to or less than the above upper limit, ions can easily permeate through the membrane and voltage loss of the membrane can be suppressed. When the porosity of the diaphragm is 30% or more, the cell voltage is not likely to become too high. When the porosity is equal to or less than 70%, the gas barrier property and mechanical strength become good, and the diaphragm is not easily deformed. In addition, gaps are unlikely to form and the pores in the porous membrane are unlikely to collapse even after long-term use.

The porosity of the porous membrane refers to an open pore ratio determined by the Archimedes method and can be obtained by the following equation.

Porosity $P$ (%)=ρ/(1+ρ)×100 where ρ=(W3−W1)/(W3−W2), W1 represents the dry mass (g) of the porous membrane, W2 represents the mass (g) of the porous membrane in water, and W3 represents the saturated mass (g) of the porous membrane.

To measure the porosity, the porous membrane washed with pure water is cut into three pieces with a size of 3 cm×3 cm to be used as measurement samples. First, W2 and W3 of the samples are measured. Then, the porous membrane is dried in a dryer set at 50° C. for 12 hours or more, and W1 is measured. Then, the porosity is determined from the values of W1, W2, and W3. The porosity is determined for the three samples, and an arithmetic mean value thereof is used as the porosity P.

Although the thickness of the porous membrane used as the diaphragm 4 is not particularly limited, the thickness is preferably between 0.20 mm and 1 mm inclusive, more preferably between 0.25 mm and 0.7 mm inclusive, and even more preferably between 0.30 mm and 0.6 mm inclusive. The thickness of the porous membrane can be measured by the method described in the examples below.

When the thickness of the porous membrane is equal to or more than the above-described lower limit, it is less likely to be torn by puncture or the like and less likely to cause a short circuit between the electrodes. In addition, the gas barrier property becomes better. When the thickness of the porous membrane is 0.20 mm or more, even better gas barrier property is obtained and the strength of the porous membrane against impact is further improved. From this viewpoint, it is more preferable that the lower limit of the thickness of the porous membrane be 0.25 mm or more.

When the thickness of the porous membrane is equal to or less than the above-described upper limit, voltage loss is less likely to increase. In addition, the effects of variations in the thickness of the porous membrane are reduced. When the thickness of the porous membrane is 0.7 mm or less, voltage loss is less likely to increase. In addition, the effects of variations in the thickness of the porous membrane are reduced. When the thickness of the porous membrane is 1 mm or less, the permeability of ions is less likely to be inhibited by the resistance of the electrolytic solution contained in the pores during operation, and even better ion permeability can be maintained. From this viewpoint, the upper limit of the thickness of the porous membrane is more preferably 0.7 mm or less, and even more preferably 0.6 mm or less.

—Anode Terminal Element—

The anode terminal element 51a has a structure in which some components of the bipolar terminal element 60 on the side of the cathode 2c are omitted, and has a partition wall 1, an outer frame 3, and an anode 2a. In FIG. 2, in the alkaline water electrolyzer 50, the anode terminal element 51a is arranged such that the anode 2a faces the side of the cathode terminal element 51c.

—Cathode Terminal Element—

The cathode terminal element 51c has a structure in which some components of the bipolar terminal element 60 on the side of the anode 2a are omitted, and has a partition wall 1, an outer frame 3, and a cathode 2c. In the alkaline water electrolyzer 50, the cathode terminal element 51c is arranged such that the cathode 2c faces the side of the anode terminal element 51a.

—Electrolytic Cell—

Due to the aforementioned arrangement of the plurality of bipolar terminal elements 60, the anode terminal element 51a, the cathode terminal element 51c, the gaskets 7, and the diaphragms 4 in the alkaline water electrolyzer 50, the anode 2a of one of two elements adjacent to each other and the cathode 2c of the other of the two elements face each other across the diaphragm 4. As illustrated by way of example in FIG. 9, a portion between the partition walls 1 of the two bipolar terminal elements 60 adjacent to each other composes an electrolytic cell 65. The electrolytic cell 65 includes the partition wall 1, the anode chamber 5a, and the anode 2a of one of the adjacent two elements, the diaphragm 4, and the cathode 2c, the cathode chamber 5c, and the partition wall 1 of the other of the adjacent two elements.

—Electrode Chamber—

The electrode chamber 5 functions as a flow channel through which the electrolytic solution passes. In the element, the partition wall 1, a portion of the outer frame 3 on the side of the anode 2a, and the diaphragm 4 opposite the anode 2a define the anode chamber 5a. In the element, the partition wall 1, a portion of the outer frame 3 on the side of the cathode 2c, and the diaphragm 4 opposite the cathode 2c define the cathode chamber 5c.

Figure 9:
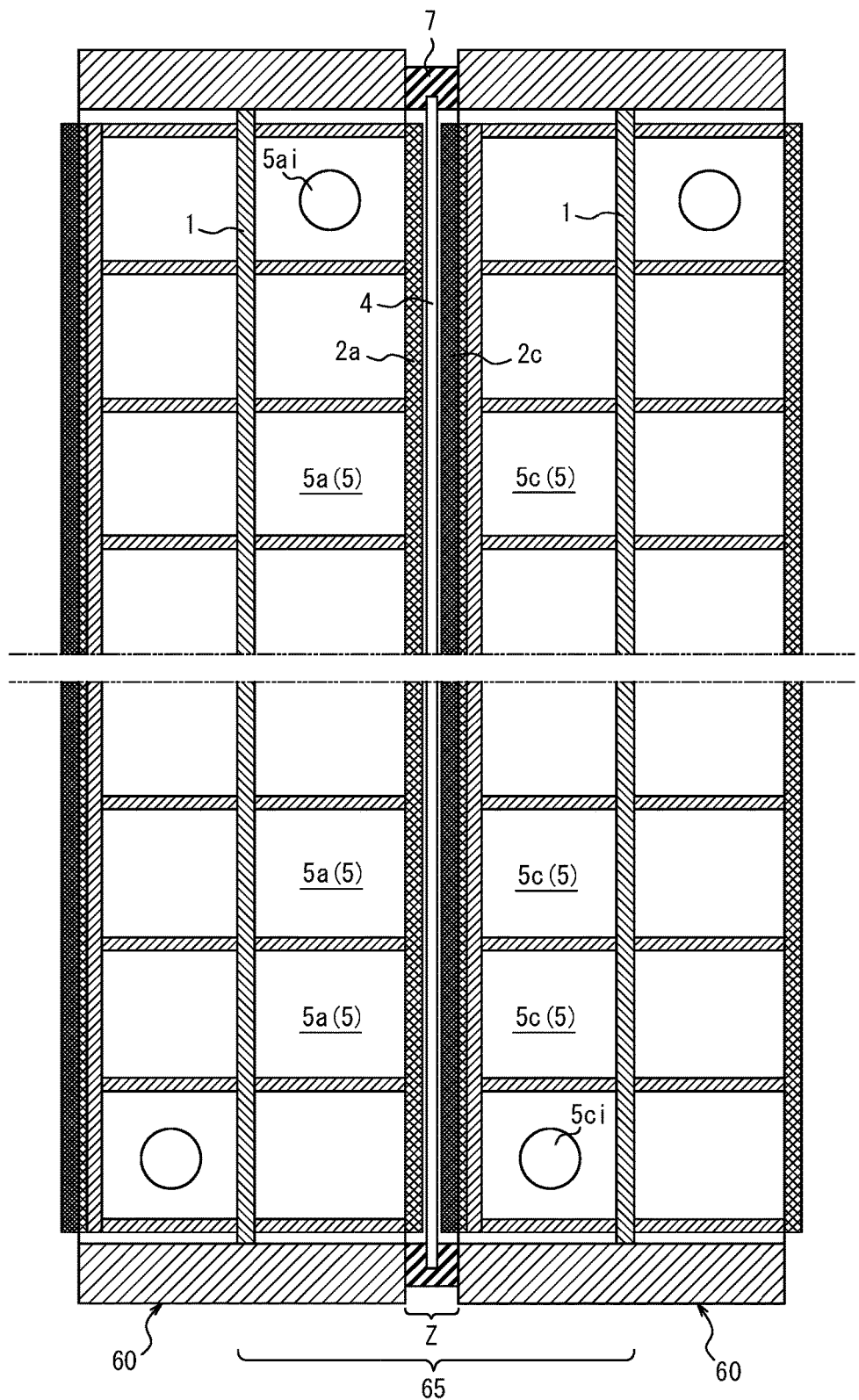
FIG. 9 is a partial cross sectional view of the entire alkaline water electrolyzer cut in the plane perpendicular to the first direction to illustrate a structure of electrolytic cells formed in the alkaline water electrolyzer of FIG. 2.

The electrode chambers 5 are provided, in the outer frame 3, with electrolytic solution inlets 5ai and 5ci that let the electrolytic solution flow into the electrode chambers 5. As illustrated in FIG. 4, the electrode chambers 5 are provided, in the outer frame 3, with electrolytic solution outlets 5ao and 5co that let the electrolytic solution flow out of the electrode chambers 5. More specifically, the anode chamber 5a is provided with the anode electrolytic solution inlet 5ai, as illustrated in FIG. 9, to let the electrolytic solution flow into the anode chamber 5a, and the anode electrolytic solution outlet Sao, as illustrated in FIG. 4, to let the electrolytic solution flow out of the anode chamber 5a. Similarly, the cathode chamber 5c is provided with the cathode electrolytic solution inlet 5ci, as illustrated in FIG. 9, to let the electrolytic solution flow into the cathode chamber 5c, and the cathode electrolytic solution outlet 5co, as illustrated in FIG. 4, to let the electrolytic solution flow out of the cathode chamber 5c.

The alkaline water electrolyzer 50 is installed so that the electrolytic solution inlets 5ai and 5ci and the electrolytic solution outlets 5ao and 5co face vertically downward and vertically upward, respectively, in the electrode chamber 5. In a configuration in which the plan view shape of the partition wall 1 is rectangular, the alkaline water electrolyzer 50 may be disposed so that the first direction D1 along the partition wall 1 is the same direction as the direction of one of two pairs of sides facing each other.

((Zero-Gap Structure))

In the bipolar electrolyzer 50 for alkaline water electrolysis of the present embodiment, as illustrated in FIG. 9, the diaphragm 4 is in contact with the anode 2a and the cathode 2c to form a zero-gap structure Z.

In alkaline water electrolysis, if there is a gap between the diaphragm 4 and the anode 2a or between the diaphragm 4 and the cathode 2c, a large amount of air bubbles generated by electrolysis, as well as the electrolytic solution, stay in this portion, thus resulting in extremely high electric resistance. In order to significantly reduce electrolysis voltage in the electrolytic cell 65, it is effective to make a distance between the anode 2a and the cathode 2c (hereinafter referred to as "anode-cathode distance") as short as possible, and eliminate the effects of the electrolytic solution and the bubbles existing between the anode 2a and the cathode 2c.

Therefore, the zero-gap structure Z is employed to keep a state in which the anode 2a and the diaphragm 4 are in contact with each other and the cathode 2c and the diaphragm 4 are in contact with each other over entire surfaces of the electrodes 2, or to keep a state in which there is almost no gap between the anode 2a and the diaphragm 4 and between the cathode 2c and the diaphragm 4 over the entire surface of the electrode 2 at a distance where the distance between the electrodes is almost the same as the thickness of the diaphragm 4.

There are known conventional proposals for reducing a distance between electrodes, such as a method of processing the anode 2a and the cathode 2c completely smooth and pressing the anode 2a and the cathode 2c so as to sandwich the diaphragm 4, a method of arranging an elastic body such as a spring between the electrode 2 and the partition wall 1 and supporting the electrode 2 with the elastic body, and a method of placing the elastic body and a current collector between the electrode 2 and the partition wall 1 and supporting the elastic body with the current collector.

In the bipolar terminal elements 60 in the zero-gap electrolytic cell 65, as a means of reducing a distance between the electrodes, it is preferable to arrange a spring, which is an elastic body, between the electrode 2 and the partition wall 1, and to support the electrode 2 with this spring. For example, in a first example, a spring made of a conductive material may be attached to the partition wall 1, and the electrode 2 may be attached to this spring. In a second example, a spring may be attached to the electrode rib 6 attached to the partition wall 1, and the electrode 2 may be attached to the spring. When adopting such a form using an elastic body, the strength, number, shape, and the like of spring/springs are required to be adjusted as necessary so that pressure with which the electrode 2 contacts the diaphragm 4 does not become uneven.

Also, by increasing the rigidity of the other electrode 2 that is the counterpart of the electrode 2 supported via the elastic body (for example, by making the rigidity of the anode stronger than that of the cathode), the structure can be made to be less deformable even when pressed. On the other hand, for the electrode 2 supported via the elastic body, by making the diaphragm 4 a flexible structure that deforms when being pressed, it is possible to maintain the zero-gap structure Z by absorbing unevenness caused by a tolerance in fabrication accuracy of the alkaline water electrolyzer 50, deformation of the electrodes 2, or the like.

More specifically, the current collector 2r is attached to tips of the rectifier plates 6 that are in electrical contact with the partition wall 1, the conductive elastic body 2e is attached to the current collector 2r on a side opposite the partition wall 1, and the electrode 2 is overlaid on a portion that is adjacent to the conductive elastic body 2e and is on the side of the diaphragm 4, in order to construct at least a three-layer structure. The current collector 2r and the conductive elastic body 2e may constitute an elastic body.

In the bipolar electrolyzer 50 for alkaline water electrolysis of the present embodiment, the conductive elastic body 2e and the current collector 2r are provided between the cathode 2c and the partition wall 1, so that the conductive elastic body 2e is sandwiched between the cathode 2c and the current collector 2r. The cathode current collector 2r is preferably in contact with the cathode ribs 6. Alternatively, the conductive elastic body 2e and the current collector 2r may be provided between the anode 2a and the partition wall 1, so that the conductive elastic body 2e is sandwiched between the anode 2a and the current collector 2r.

The zero-gap structure Z of the electrolytic cell 65 for alkaline water electrolysis of the present embodiment preferably has a structure in which the bipolar terminal elements 60, in each of which the anode ribs 6 and the anode 2a are overlaid in this order on the partition wall 1 on the side of the anode 2a, and the cathode ribs 6, the cathode current collector 2r, the conductive elastic body 2e, and the cathode 2c are overlaid in this order on the partition wall 1 on the side of the cathode 2c, are overlaid via the diaphragms 4, and each of the diaphragms 4 is in contact with the anode 2a and the cathode 2c.

((Pressing of Gasket))

As described above, the gasket 7 is pressed by the outer frames 3 in both directions in the lamination direction by tightening during formation of the alkaline water electrolyzer 50. The pressing surface pressure of the gasket 7 by the outer frames 3 in the present embodiment is preferably between 1 MPa and 10 MPa inclusive. The pressing surface pressure is an average pressing surface pressure of an entire contact surface between the gasket 7 and the outer frame 3. The average pressing surface pressure is pressure that contact surface pressure between the electrodes 2 associated with the zero-gap structure and the internal pressure of the alkaline water electrolyzer 50 are subtracted from tightening pressure of the alkaline water electrolyzer 50.

It is only necessary to design the pressing surface pressure of the gasket 7 such that the contact surface pressure becomes equal to the internal pressure, but the pressing surface pressure of the gasket 7 is generally designed to be high in consideration of smoothness of the contact surface, creep of the gasket 7, and the like. Therefore, the pressing surface pressure of the gasket 7 may be selected appropriately within a range not exceeding physical durability of the gasket 7, taking the internal pressure of the alkaline water electrolyzer 50 into consideration. The pressing surface pressure of the gasket 7 in the present embodiment is preferably designed so that the protrusion portions 7$p$ are applied with the contact surface pressure higher than the internal pressure of the alkaline water electrolyzer 50. In addition, the gasket 7 in the present embodiment has the slit SL, and for the purpose of preventing in-tank leakage, as described below, it is preferable that the pressing surface pressure be designed so that contact surface pressure between the surface of the slit SL of the gasket 7 and the diaphragm 4 also exceeds the internal pressure.

The inventor of the present application studied the average pressing surface pressure that satisfies these design requirements, and found that the pressing surface pressure of the gasket 7 is preferably between 1 MPa and 10 MPa inclusive and maximum contact surface pressure, which will be described later, is preferably between 3 MPa and 20 MPa inclusive, in order to prevent the gasket 7 or the diaphragm 4 from breaking and cracking, while preventing in-tank leakage and out-of-tank leakage. To explain in more detail, when the pressing surface pressure of the gasket 7 is 1 MPa or more, not only leakage of the electrolytic solution and the gas generated by electrolysis (out-of-tank leakage) from between the gasket 7 and the outer frame 3, but also in-tank leakage, as described below, can be prevented. Also, when the pressing surface pressure of the gasket 7 is 10 MPa or less, breaking and cracking of the gasket 7 or the diaphragm 4 can be prevented.

The gasket 7 is deformed so that the slit SL is narrowed by pressing from the outer frames 3. The gasket 7 is also deformed such that the first protrusion portion 7$p1$ and the second protrusion portion 7$p2$ are crushed by the pressing. The first protrusion portion 7$p1$ can deform in the thickness direction of the slit SL in the gasket 7. Therefore, the gasket 7 presses the diaphragm 4 at a position overlapping the first protrusion portion 7$p1$ in the thickness direction of the slit SL with a maximum contact surface pressure that is larger than at other positions.

The maximum contact surface pressure is preferably between 3 MPa and 20 MPa inclusive. Further, the maximum contact surface pressure is preferably 1.5 or more times as large as the pressing surface pressure of the gasket 7 by the outer frames 3. When the maximum contact surface pressure is 1.5 or more times as large as the pressing surface pressure, pressing force required to suppress both in-tank leakage and out-of-tank leakage can be efficiently utilized, and a creep rate of the gasket can be reduced. In addition, a load applied to the outer frame and other components can be reduced, and thus unintended deflection of the electrolyzer can be prevented. The maximum contact surface pressure of the gasket 7 is preferably designed to satisfy the same purpose as the pressing surface pressure. As a result of diligent examination of the maximum contact surface pressure that satisfies such a required design, the inventor of the present application has found that the maximum contact surface pressure is preferably between 3 MPa and 20 MPa inclusive and the pressing surface pressure of the gasket 7 is preferably between 1 MPa and 10 MPa inclusive, as described above, thereby preventing the gasket 7 or the diaphragm 4 from breaking and cracking. To explain in more detail, when the maximum contact surface pressure is 3 MPa or more, leakage of the electrolytic solution and the gas generated by electrolysis between the two electrode chambers 5 via the diaphragm 4, (in-tank leakage) can be prevented. When the maximum contact surface pressure is 20 MPa or less, breaking and cracking of the gasket 7 and the diaphragm 4 can be prevented.

The maximum contact surface pressure is measured by releasing the alkaline water electrolyzer 50 from being tightened by the tie rods 51$r$ or the like, pulling out the gasket 7, replacing the diaphragm 4 caught by the gasket 7 with pressure-sensitive paper that changes color according to pressure, and sandwiching the gasket 7 between the outer frames 3 again with the same pressing surface pressure as before the releasing. After sandwiching, the gasket 7 is released from being tightened again, and the pressure-sensitive paper is taken out from the extracted gasket 7, and the discolored color is measured visually.

In the gasket 7, a first volume change ratio of the void between the end of the diaphragm 4 at the slit SL and the bottom of the slit SL, from a state before assembly of the alkaline water electrolyzer 50 to a state of being deformed by pressing from the outer frames 3, is preferably between 0.5 and 1.0 inclusive. In other words, when A2 represents the volume of the void between the end of the diaphragm 4 and the bottom of the slit SL deformed by pressing from the outer frames 3, the first volume change ratio=$\{(A1-A2)/A1\}$ is preferably between 0.5 and 1.0 inclusive. A first volume change ratio of 0.5 or more can prevent breaking of the diaphragm due to application of excessive stress to the diaphragm by deformation when the gasket 7 is pressed against the diaphragm. A first volume change ratio of 1.0 or less can obtain appropriate contact stress between the gasket 7 and the diaphragm 4 necessary for in-tank leakage. The volume A2 of the void between the the end of the diaphragm 4 and the bottom of the slit SL, in the slit SL deformed by pressing from the outer frames 3, can be measured by a method described in the examples below.

In the gasket 7, a second volume change ratio of the first protrusion portion 7$p1$, from a state before assembly of the alkaline water electrolyzer 50 to a state of being deformed by pressing from the outer frames 3, is preferably between 0.5 and 1.0 inclusive. In other words, when B2 represents the volume of the first protrusion portion 7$p1$ deformed by pressing from the outer frames 3, the second volume change ratio=$\{(B1-B2)/B1\}$ is preferably between 0.5 and 1.0 inclusive. A second volume change ratio of 0.5 or more can secure contact surface pressure necessary to prevent internal leakage against the diaphragm 4 in the slit SL. A second volume change ratio of 1.0 or less can prevent breaking of the diaphragm 4 due to application of excessive stress to the diaphragm 4. The first protrusion portion 7$p1$ is a portion that protrudes from a plane perpendicular to the thickness direction of the slit SL both before and after the deformation. Therefore, in a case in which a portion that constitutes the first protrusion portion 7$p1$ before deformation is deformed by pressing to constitute a plane perpendicular to the thickness direction, a portion protruding from the plane is regarded as the first protrusion portion 7$p1$ after deformation. The volume B2 of the first protrusion portion 7$p1$ in a state of being deformed by pressing from the outer frames 3 can be measured by a method described in the examples below.

In the gasket 7, a volume change ratio of the second protrusion portion 7$p2$, from a state before assembly of the alkaline water electrolyzer 50 to a state of being deformed by pressing from the outer frames 3, is preferably between 0.5 and 1.0 inclusive. In other words, when C1 and C2 represent the volume of the second protrusion portion 7$p$2 in a state before assembly of the alkaline water electrolyzer 50 and in a state of being deformed by pressing from the outer frames 3, respectively, the volume change ratio={(C1−C2)/C1} is preferably between 0.5 and 1.0 inclusive. A volume change ratio of 0.5 or more can secure contact surface pressure between the outer frame 3 and the gasket 7 sufficient to prevent out-of-tank leakage. A volume change ratio of 1.0 or less can prevent breaking of the gasket 7 due to application of excessive stress to the gasket 7. The second protrusion portion 7$p$2 is a portion that protrudes from a plane perpendicular to the thickness direction of the slit SL both before and after the deformation. Therefore, in a case in which a portion that constitutes the second protrusion portion 7$p$2 before deformation is deformed by pressing to constitute a plane perpendicular to the thickness direction, a portion protruding from the plane is regarded as the second protrusion portion 7$p$2 after deformation. The volumes C1 and C2 of the second protrusion portion 7$p$2 in a state before assembly of the alkaline water electrolyzer 50 and a state of being deformed by pressing from the outer frames 3 can be measured by a method described in the examples below.

In the gasket 7, it is preferable that a ratio [(B1−B2)/B1]/[(A1−A2)/A1] of the second volume change ratio to the first volume change ratio be between 0.5 and 1.0 inclusive. When the ratio between the volume change ratios is 0.5 or more, contact surface pressure between the gasket 7 and the diaphragm 4 sufficient to prevent in-tank leakage can be obtained. When the ratio between the volume change ratios is 1.0 or less, breaking of the diaphragm 4, due to application of excessive stress to the diaphragm 4, can be prevented.

The amount of deflection of the wall portion 3$w$ of the gas-liquid separation box 3$sp$, from a state before assembly of the alkaline water electrolyzer 50 to a state of overlaying the frame of the gasket 7 on the outer frame 3 in the entire circumferential direction and pressing the outer frame 3 against the gasket 7 at 2 MPa, is preferably 0.3 mm or less. An amount of deformation of 0.3 mm or less can apply sufficient stress to the gasket 7, thus preventing in-tank leakage and out-of-tank leakage. The amount of deflection of the wall portion 3$w$, when the outer frame 3 is pressed against the gasket 7 at 2 MPa, can be measured by a method described in the examples below.

EXAMPLES

Specific examples and comparative examples are described below, but the disclosure is not limited to these.

Measurement methods and test methods used in the examples will be described below.

(Thickness of Diaphragm)

The thickness of the diaphragm cut out to an appropriate size was measured at five or more points with a digital thickness gauge, and an arithmetic mean of the measurements was used as the thickness of the diaphragm.

(Thickness of Slit)

The thickness of the gasket cut out to an appropriate size was measured at five or more points with a digital thickness gauge, and an arithmetic mean of the measurements was used as the thickness of the gasket. Next, the thickness of each of the two opposite wall portions, which define the slit in the gasket, was measured at five or more points with a digital thickness gauge, and an arithmetic mean of the measurements was used as the thickness of each of the two wall portions. A thickness obtained by subtracting the sum of the measured thicknesses of the two wall portions from the measured thickness of the gasket was used as the thickness of the slit.

(Amount of Deflection of Wall Portion)

The amount of deflection of the wall portion of the gas-liquid separation box, which will be described below, was measured by image analysis using X-ray CT. In the measurement, the amount of deflection of the wall portion was measured at least five points in the width direction of the electrolytic cell, while a cell frame, which will be described later, was pressed against the gasket at 2 MPa, and an arithmetic mean of the measurements was used as the amount of deflection of the wall portion.

(Volume of Void Between End of Diaphragm and Bottom of Slit)

The volume of the void between the end of the diaphragm and the bottom of the slit at the time of being released can be calculated by subtracting the area of the diaphragm from the inner area of the gasket, including a slit depth, and multiplying the subtraction result by a slit height. Also, the volume at the time of catch can be measured by image analysis of cross section using X-ray CT.

(Volumes of First and Second Protrusion Portions)

The volumes of the first and second protrusion portions at the time of being released can be measured by image analysis of cross section of the gasket using X-ray CT.

(Out-of-Tank Leakage Test)

Figure 10:
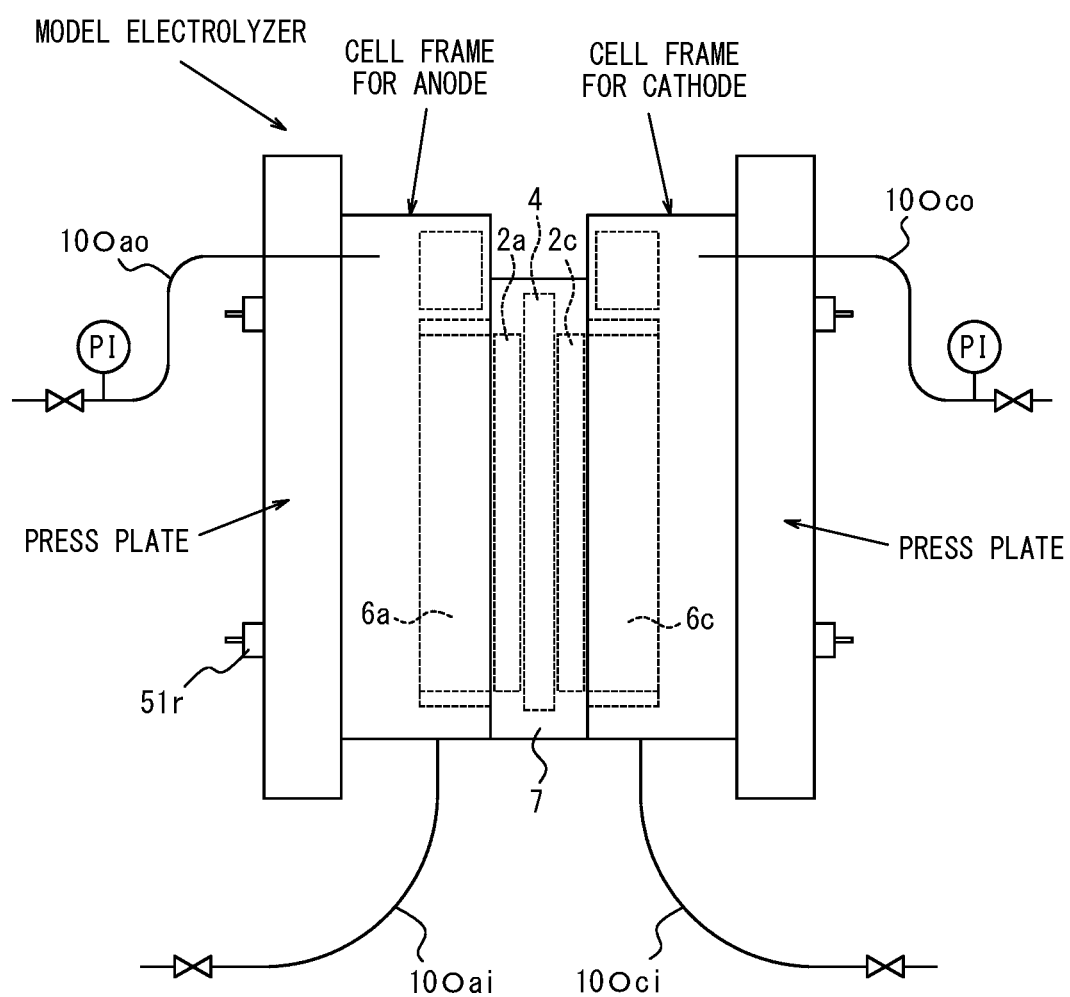
FIG. 10 is a diagram illustrating a schematic structure of a model electrolyzer for conducting an out-of-tank leakage test.

A model electrolyzer illustrated in FIG. 10 was fabricated, as described below.

—Partition Wall, Outer Fame, and Rectifier Plates—

The cell frame made of a transparent material (acrylic) that allows the inside of the electrolytic cell to be seen was used as the partition wall and the outer frame 3 that constitute the model electrolyzer.

First, an acrylic plate with a thickness Q of 75 mm, a horizontal width R of 300 mm, and a vertical width P of 1.45 m or 2.65 m was prepared.

Then, the acrylic plate was shaved from one side for space that is to be the electrode chamber (a predetermined thickness, a horizontal width of 250 mm, and a predetermined vertical width) to prepare the box-shaped cell frame with the electrode chamber of the desired size.

As the rectifier plates, two to four acrylic plates having a thickness of 3 mm were provided at a desired interval C along the direction of the horizontal width R. The two to four rectifier plates were arranged so as to be symmetrical with respect to the center of the electrode chamber in the direction of the horizontal width R. Distances between each of ends of the rectifier plates in an extending direction and the electrode chamber in the direction of the vertical width P were set at 100 mm at both ends.

—Anode—

As the anode, a pre-blasted nickel expanded substrate was used. The size of the anode was the same as the size of the electrolysis chamber.

Cathode

As a conductive substrate, a plain weave mesh substrate made of fine nickel wires of 0.15 mm diameter woven with a mesh opening of 40 mesh was used. The thickness of the cathode was 0.3 mm. The size of the cathode was the same as the size of the electrolysis chamber.

—Diaphragm—

As the diaphragm, a commercially available porous membrane for water electrolysis ("Zirfon Perl UTP500", manufactured by Agfa) was used. The thickness of the diaphragm was 500 um and the tensile rupture strength at room temperature was 25 MPa.

—Gasket—

As the gasket, one made of EPDM rubber and having an elastic modulus of 4.0 MPa at 100% deformation was used. For the gasket inserted between the cell frame and the electrode, one having an opening the dimension of which in plan view is equal to the dimension of the electrode chamber of the acrylic cell frame was used.

Figure 11:
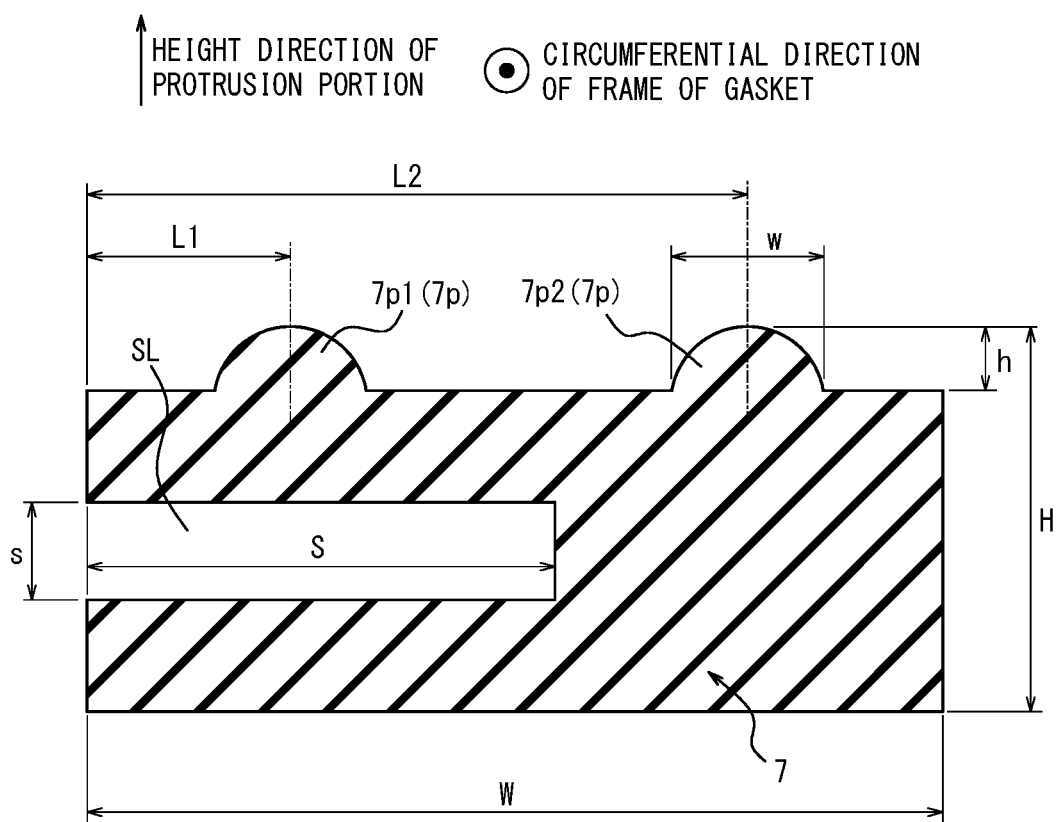
FIG. 11 is a partial cross sectional view to explain the dimensions of the gasket used in an in-tank leakage test.
Figure 12:
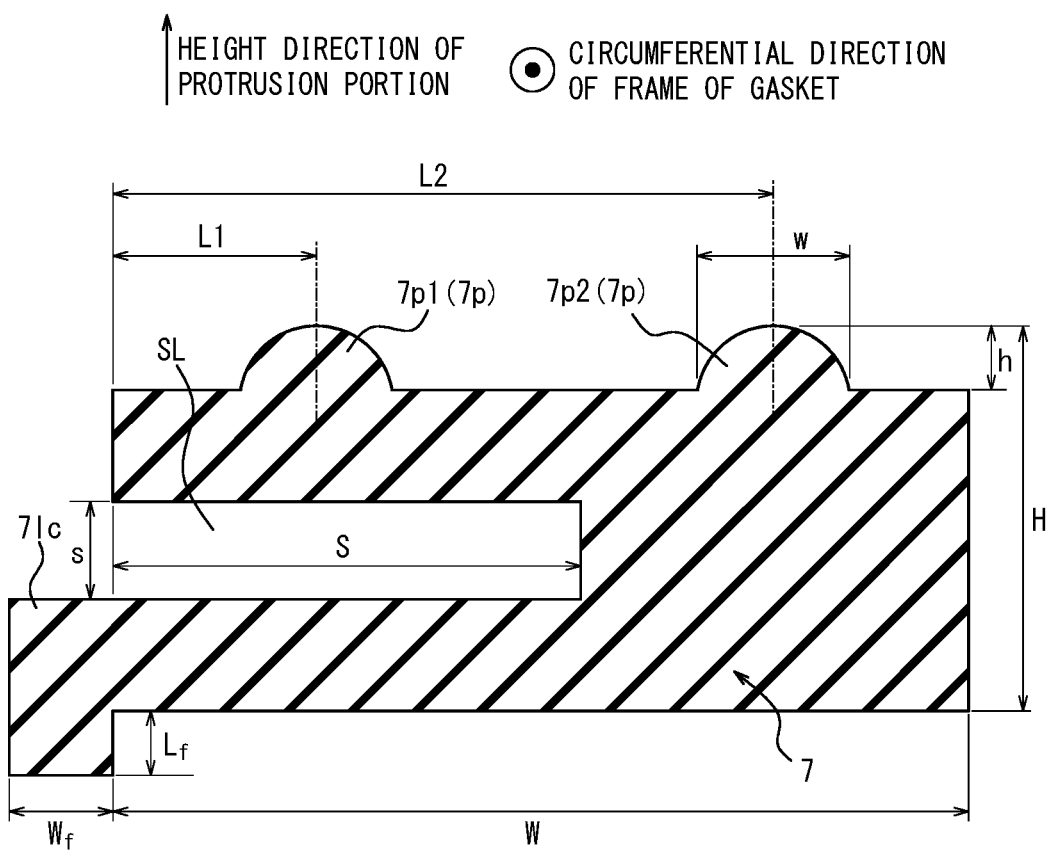
FIG. 12 is a partial cross sectional view to explain the dimensions of the gasket used in the in-tank leakage test.
Figure 13:
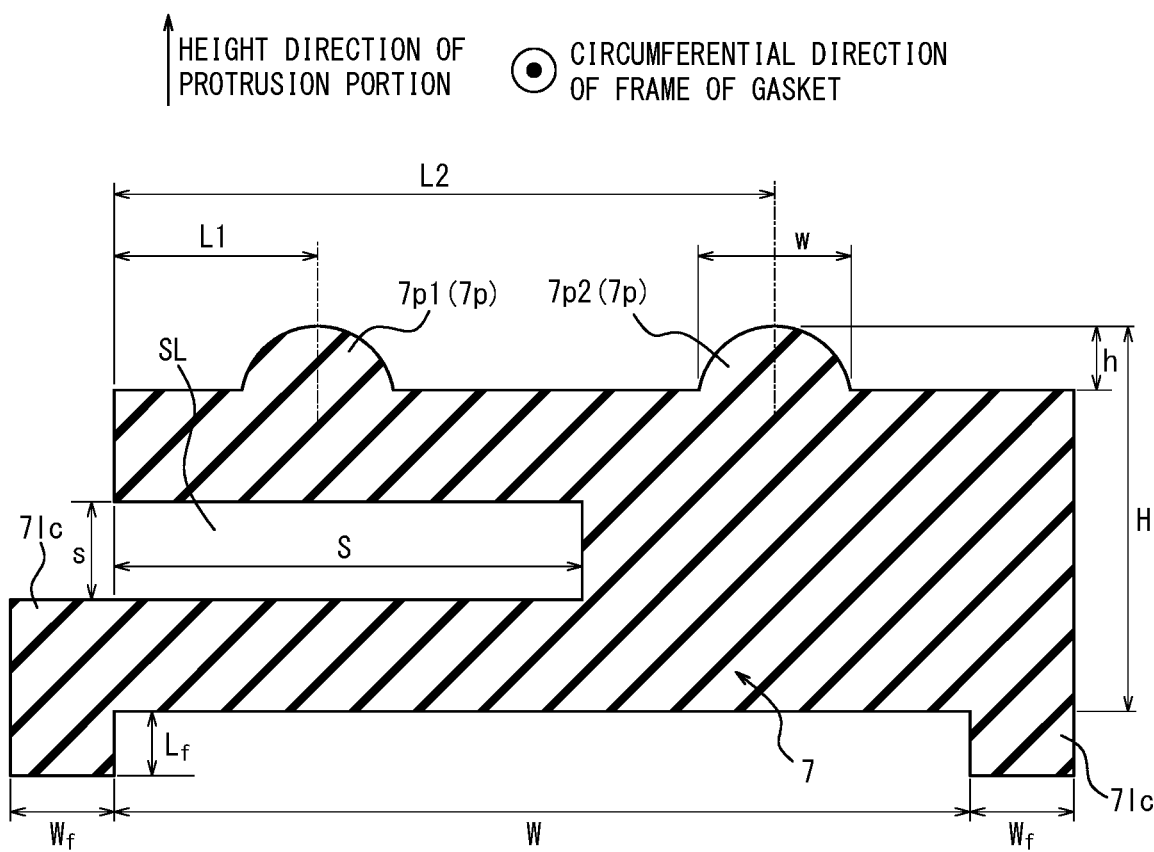
FIG. 13 is a partial cross sectional view to explain the dimensions of the gasket used in the in-tank leakage test.

In particular, for the gasket inserted between the cathode and the anode, one having an opening the dimension of which in plan view is equal to the dimension of the electrode chamber of the acrylic cell frame, and having a slit structure of 0.4 mm in thickness to hold the diaphragm inserted therein at a central portion of the inner wall of the opening in the thickness direction was used. For other dimensions, gaskets A to J listed in Table 1 were fabricated and used. The gaskets A to J each had, as the first protrusion portion $7p1$, a first protrusion portion $7p1$ that overlaps the slit SL when viewed from a height direction of the protrusion portion $7p$. In addition, the gaskets B to D and the gaskets H to J each had, as the second protrusion portion $7p2$, a protrusion portion $7p2$ that overlaps the slit SL when viewed from the height direction of the protrusion portion $7p$. In each of the gaskets, the second protrusion portion had the same shape as the first protrusion portion. Further, the gaskets H and I each had a lock portion $71c$ on an inner peripheral side. The gasket J had lock portions $71c$ on inner and outer peripheral sides.

sion portion position L1 is a distance between an inner end of the gasket 7 and a position of the first protrusion portion $7p1$ at a maximum height, in a direction that is perpendicular to the circumferential direction of the frame and is perpendicular to the height direction of the protrusion portion $7p$, as illustrated in FIG. 11. The second protrusion position L2 is a distance between the inner end of the gasket 7 and a position of the second protrusion portion $7p2$ at a maximum height in the direction that is perpendicular to the circumferential direction of the frame and is perpendicular to the height direction of the protrusion portion $7p$, as illustrated in FIG. 11. The total width W is a width between the inner end of the gasket 7 and an outer end of the gasket 7 in cross section perpendicular to the circumferential direction of the frame of the gasket 7, as illustrated in FIG. 11. However, as illustrated in FIGS. 12 and 13, in a configuration in which the lock portion $71c$ is provided at the inner end or outer end of the gasket 7, the total width W is a width excluding the width of the lock portion $71c$. The slit length S is the depth of the slit SL from the inner end of the gasket 7 in a direction that is perpendicular to the circumferential direction of the frame and is perpendicular to the height direction of the protrusion portion, as illustrated in FIG. 11. The total length H is the thickness of the gasket including the protrusion portion $7p$, as illustrated in FIG. 11. However, as illustrated in FIGS. 12 and 13, in a configuration in which the gasket 7 has the lock portion $71c$, the total length H is a length

TABLE 1

| Gasket | Unit | A | B | C | D | E | F | G | H | I | J |
|---|---|---|---|---|---|---|---|---|---|---|---|
| Height of protrusion portion (h) | mm | 1.0 | 1.0 | 0.5 | 2.0 | 0.25 | 1.5 | 1.5 | 1.0 | 1.0 | 1.0 |
| Width of protrusion portion (w) | mm | 2.0 | 2.0 | 1.0 | 2.0 | 0.25 | 2.0 | 2.0 | 2.0 | 2.0 | 2.0 |
| Position of first protrusion portion (L1) | mm | 7.0 | 7.0 | 7.0 | 7.0 | 7.0 | 7.0 | 7.0 | 7.0 | 7.0 | 7.0 |
| Position of second protrusion portion (L2) | mm | — | 18.0 | 18.0 | 18.0 | | — | — | 18.0 | 18.0 | 18.0 |
| Total width (W) | mm | 25.0 | 25.0 | 25.0 | 25.0 | 25.0 | 25.0 | 25.0 | 25.0 | 25.0 | 25.0 |
| Slit length (S) | mm | 14.0 | 14.0 | 14.0 | 14.0 | 14.0 | 14.0 | 14.0 | 14.0 | 14.0 | 14.0 |
| Slit thickness (s) | mm | 0.4 | 0.4 | 0.4 | 0.4 | 0.4 | 0.4 | 0.4 | 0.4 | 0.4 | 0.4 |
| Total height (H) | mm | 5.0 | 5.0 | 4.5 | 6.0 | 4.25 | 5.5 | 11.0 | 5.0 | 5.0 | 5.0 |
| Provision of lock portion | None | None | None | None | None | None | None | None | Inside | Inside | Inside and outside |
| Width of lock portion ($W_f$) | mm | — | — | — | — | — | — | — | 1.0 | 5.0 | 2.0 |
| Length of lock portion ($L_f$) | mm | — | — | — | — | — | — | — | 2.0 | 2.0 | 4.0 |

In Table 1, the protrusion height h refers to the height of the protrusion portion $7p$ from a surface on which the protrusion portion $7p$ is provided in the gasket 7, as illustrated in FIG. 11. The protrusion height h is the height of the first protrusion portion $7p1$ in the gasket 7 having the first protrusion portion $7p1$. The protrusion height h is the height of the second protrusion portion $7p2$ in the gasket 7 having the second protrusion portion $7p2$. The protrusion portion width w refers to the width of the protrusion portion $7p$ in a direction that is perpendicular to the circumferential direction of the gasket 7 and is perpendicular to the height direction of the protrusion portion $7p$, as illustrated in FIG. 11. The protrusion portion width w is the width of the first protrusion portion $7p1$ in the gasket 7 having the first protrusion portion $7p1$. The protrusion portion width w is the width of the second protrusion portion $7p2$ in the gasket 7 having the second protrusion portion $7p2$. The first protruexcluding the length Lf of the lock portion $71c$. The slit thickness s is a distance between opposite inner surfaces of the slit SL in the height direction of the protrusion portion $7p$, as illustrated in FIG. 11. The lock portion width Wf is a maximum value of a length protruding outwardly or inwardly from the total width W in contact with the outer frame, as illustrated in FIGS. 12 and 13. The lock portion length Lf is a maximum length of the lock portion $71c$ protruding from the surface of the gasket 7 in the thickness direction of the gasket, as illustrated in FIGS. 12 and 13.

From one side to the other, a press plate, the cell frame for anode, the gasket 7, the anode $2a$, the gasket 7 containing the diaphragm 4, the cathode $2c$, the gasket 7, the cell frame for cathode, and another press plate are arranged in this order, and stacked by tightening these components with the tie rods $51r$ from both sides of the press plates, to assemble the model electrolyzer.

An anode inlet-side hose 100ai was attached to a vertically lower part of the cell frame for anode to allow the electrolytic solution to flow into the anode chamber. An anode outlet-side hose 100ao was attached to a side upper part of the cell frame for anode to allow the electrolytic solution to flow out of the anode chamber. A cathode inlet-side hose 100ci was attached to a vertically lower part of the cell frame for cathode to allow the electrolytic solution to flow into the cathode chamber. A cathode outlet-side hose 100co was attached to a side upper part of the cell frame for cathode to allow the electrolytic solution to flow out of the cathode chamber. Pressure gauges PI were attached to the anode outlet-side hose 100ao and the cathode outlet-side hose 100co.

The anode inlet-side hose 100ai, the anode chamber 5a, and the anode outlet-side hose 100ao, the cathode inlet-side hose 100ci, the cathode chamber 5c, and the cathode outlet-side hose 100co were sealed with water at 100 kPa. The hoses were left sealed for 15 minutes and fluctuations in pressure values were measured. After leaving, water leakage from between the gasket 7 and the cell frame was also visually checked. If the fluctuations of the pressure gauges were 1 kPa or less or the water leakage was not found, the test was passed.

(In-Tank Leakage Test)

A model electrolyzer identical to that used in the out-of-tank leakage test was fabricated.

Figure 14:
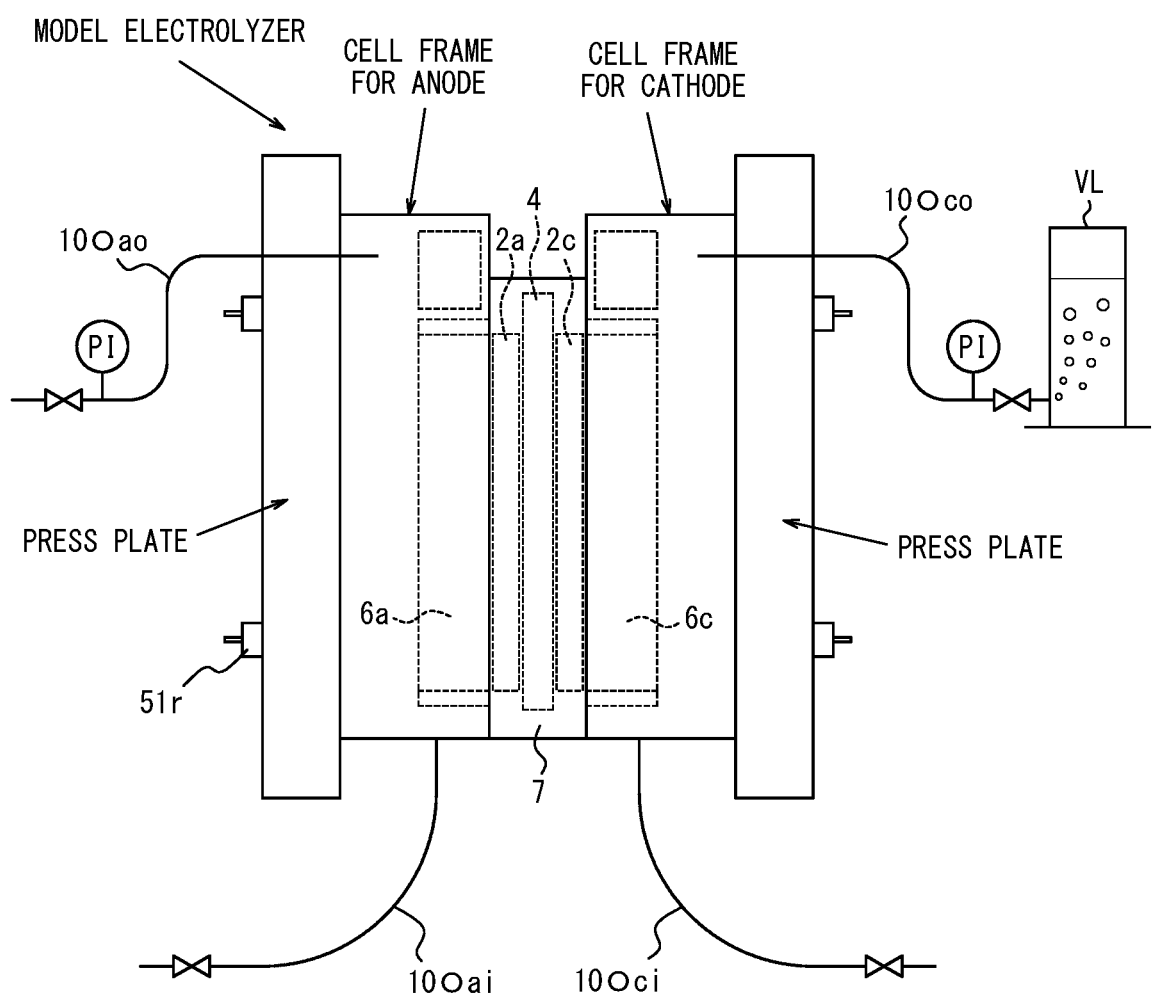
FIG. 14 is a diagram illustrating a schematic structure of a model electrolyzer for conducting the in-tank leakage test.

As illustrated in FIG. 14, an anode inlet-side hose 100ai, an anode outlet-side hose 100ao, a cathode inlet-side hose 100ci, and a cathode outlet-side hose 100co, through which the electrolytic solution passes, were attached to an acrylic cell frame that serves as an enclosure in the model electrolyzer, as in the out-of-tank leakage test. The cathode outlet-side hose 100co was connected to a nozzle of a vessel VL having the nozzle at its lower end portion.

Valves of the anode inlet-side hose 100ai and the anode outlet-side hose 100ao were closed. Next, water was poured into the vessel VL to a height of 50 cm, and an inflow of air was started from the cathode inlet-side hose 100ci to stably generate bubbles by outflowed air from the vessel VL. By this operation, pressure was maintained at 5 kPa on the cathode side, and differential pressure with the anode side is generated. After a lapse of 10 minutes from the start of the inflow, fluctuation in a pressure value on the anode side was measured. After the measurement, the anode outlet-side hose 100ao was opened, soapy water was applied to the anode outlet-side hose 100ao to visually determine whether bubbles were generated. If the fluctuation of the pressure gauge was within 0.5 kPa or no bubbles were generated, the test was passed.

(Repeated Tightening Test)

A model electrolyzer identical to that used in the out-of-tank leakage test was fabricated.

The electrolyzer was heated up to 60° C. or higher, while circulating 80° C. water from the anode inlet-side hose 100ai and the cathode inlet-side hose 100ci. After the liquid was drained, clamping force was adjusted and the electrolyzer was repeatedly tightened with sealing surface pressure of the gasket 7 at 0 MPa and 4 MPa. After 25 times of repeated tightening, the in-tank leakage test was conducted. If the fluctuation in the pressure gauge was within 0.5 kPa or no bubbles were generated, the test was passed.

In addition, the amount of protrusion of the gasket before and after the repeated tightening was measured. The gasket was evaluated as A if the difference between before and after was ±1 mm, B if the difference was within ±3 mm, and C if the difference was more than that. Here, the amount of protrusion of the gasket is a length from an outermost part of the outer frame to an outermost part of the gasket.

Example 1

Using the gasket A described in Table 1, the diaphragm was inserted to a position of 2.5 mm from the deepest part of the slit, and the model electrolyzer was tightened by the tie rods 51r at 0.5 MPa to fabricate the model electrolyzer of Example 1. The model electrolyzer of Example 1 was subjected to the evaluation tests, except for the above-described measurements and repeated tightening test. The results are illustrated in Table 2.

TABLE 2

|  |  |  | Example 1 | Example 2 | Example 3 | Example 4 | Example 5 |
|---|---|---|---|---|---|---|---|
| Gasket |  |  | A | A | B | B | B |
| Volume of first protrusion portion | Released | B1 | 1.000 | 1.000 | 1.000 | 1.000 | 1.000 |
|  | Caught | B2 | 0.432 | 0.000 | 0.298 | 0.000 | 0.432 |
| Volume of second protrusion portion | Released | C1 | — | — | 1.000 | 1.000 | 1.000 |
|  | Caught | C2 | — | — | 0.298 | 0.000 | 0.432 |
| Volume of void | Released | A1 | 0.396 | 0.396 | 0.016 | 0.016 | 0.396 |
|  | Caught | A2 | 0.198 | 0.013 | 0.003 | 0.003 | 0.198 |
| Volume ratio | B1/A1 |  | 2.53 | 2.53 | 63.13 | 63.13 | 2.53 |
| Volume change ratio | (1)(A1 − A2)/A1 |  | 0.50 | 0.97 | 0.80 | 0.81 | 0.50 |
|  | (2)(B1 − B2)/B1 |  | 0.57 | 1.00 | 0.70 | 1.00 | 0.57 |
|  | (C1 − C2)/C1 |  | — | — | 0.70 | 1.00 | 0.57 |
| Ratio between volume change ratios | (2)/(1) |  | 1.14 | 1.03 | 0.88 | 1.23 | 1.14 |
| Pressing surface pressure |  |  | 0.5 MPa | 4.0 MPa | 1.0 MPa | 8.0 MPa | 1.0 MPa |
| Out-of-tank leakage test |  |  | Pass | Pass | Pass | Pass | Pass |
| In-tank leakage test |  |  | Pass | Pass | Pass | Pass | Pass |
| Thickness of membrane |  |  | 500 um | 500 um | 500 um | 500 um | 500 um |
| Amount of deflection of wall portion |  |  | 0.03 mm | 0.13 mm | 0.06 mm | 0.19 mm | 0.05 mm |
| Comment |  |  |  |  |  |  |  |

TABLE 2-continued

|  |  |  | Example 6 | Example 7 | Example 8 | Example 9 |
|---|---|---|---|---|---|---|
| Gasket |  |  | B | B | B | F |
| Volume of first protrusion portion | Released | B1 | 1.000 | 1.000 | 1.000 | 1.500 |
|  | Caught | B2 | 0.000 | 0.416 | 0.000 | 0.792 |
| Volume of second protrusion portion | Released | C1 | 1.000 | 1.000 | 1.000 | — |
|  | Caught | C2 | 0.000 | 0.416 | 0.000 | — |
| Volume of void | Released | A1 | 0.396 | 1.109 | 1.109 | 1.109 |
|  | Caught | A2 | 0.013 | 0.101 | 0.021 | 0.475 |
| Volume ratio | B1/A1 |  | 2.53 | 0.90 | 0.90 | 1.35 |
| Volume change ratio | (1)(A1 − A2)/A1 |  | 0.97 | 0.91 | 0.98 | 0.57 |
|  | (2)(B1 − B2)/B1 |  | 1.00 | 0.58 | 1.00 | 0.47 |
|  | (C1 − C2)/C1 |  | 1.00 | 0.58 | 1.00 | — |
| Ratio between volume change ratios | (2)/(1) |  | 1.03 | 0.64 | 1.02 | 0.83 |
| Pressing surface pressure |  |  | 8.0 MPa | 1.0 MPa | 8.0 MPa | 0.2 MPa |
| Out-of-tank leakage test |  |  | Pass | Pass | Pass | Pass |
| In-tank leakage test |  |  | Pass | Pass | Pass | Pass |
| Thickness of membrane |  |  | 500 um | 500 um | 500 um | 500 um |
| Amount of deflection of wall portion |  |  | 0.18 mm | 0.04 mm | 0.17 mm | 0.03 mm |
| Comment |  |  |  |  |  |  |

TABLE 3

|  |  |  | Example 10 | Example 11 | Example 12 | Example 13 | Example 14 | Comparative Example 1 | Comparative Example 2 | Comparative Example 3 |
|---|---|---|---|---|---|---|---|---|---|---|
| Gasket |  |  | B | G | H | I | J | C | D | E |
| Volume of first protrusion portion | Released | B1 | 1.000 | 1.500 | 1.000 | 1.000 | 1.000 | 0.500 | 2.000 | 0.250 |
|  | Caught | B2 | 0.000 | 0.000 | 0.444 | 0.448 | 0.455 | 0.208 | 0.000 | 0.000 |
| Volume of second protrusion portion | Released | C1 | — | — | 1.000 | 1.000 | 1.000 | 0.500 | 2.000 | — |
|  | Caught | C2 | — | — | 0.444 | 0.448 | 0.455 | 0.208 | 0.000 | — |
| Volume of void | Released | A1 | 0.016 | 0.396 | 0.396 | 0.396 | 0.396 | 1.109 | 0.016 | 1.109 |
|  | Caught | A2 | 0.000 | 0.000 | 0.218 | 0.238 | 0.277 | 0.238 | 0.004 | 0.396 |
| Volume ratio | B1/A1 |  | 63.13 | 3.79 | 2.53 | 2.53 | 2.53 | 0.45 | 126.25 | 0.23 |
| Volume change ratio | (1)(A1 − A2)/A1 |  | 1.00 | 1.00 | 0.45 | 0.40 | 0.30 | 0.79 | 0.75 | 0.64 |
|  | (2)(B1 − B2)/B1 |  | 1.00 | 1.00 | 0.56 | 0.55 | 0.54 | 0.58 | 1.00 | 1.00 |
|  | (C1 − C2)/C1 |  | — | — | 0.56 | 0.55 | 0.54 | 0.58 | 1.00 | — |
| Ratio between volume change ratios | (2)/(1) |  | 1.00 | 1.00 | 1.24 | 1.38 | 1.82 | 0.74 | 1.33 | 1.56 |
| Pressing surface pressure |  |  | 14.0 MPa | 8.0 MPa | 1.0 MPa | 1.0 MPa | 1.0 MPa | 1.0 MPa | 1.0 MPa | 2.0 MPa |
| Out-of-tank leakage test |  |  | Pass | Pass | Pass | Pass | Pass | Pass | Pass | Pass |
| In-tank leakage test |  |  | Pass | Pass | Pass | Pass | Pass | Fail | Fail | Fail |
| Thickness of membrane |  |  | 500 um | 500 um | 500 um | 500 um | 500 um | 500 um | 500 um | 500 um |
| Amount of deflection of wall portion |  |  | 0.35 mm | 0.17 mm | 0.06 mm | 0.06 mm | 0.06 mm | 0.06 mm | 0.07 mm | 0.14 mm |
| Comment |  |  |  |  |  |  |  |  | Cracking in membrane | Cracking in gasket |

Example 2

Using the gasket A described in Table 1, the diaphragm was inserted to a position of 2.5 mm from the deepest part of the slit, and the model electrolyzer was tightened by the tie rods 51r at 4.0 MPa to fabricate the model electrolyzer of Example 2. The model electrolyzer of Example 2 was subjected to the evaluation tests, except for the above-described measurements and repeated tightening test. The results are illustrated in Table 2.

Example 3

Using the gasket B described in Table 1, the diaphragm was inserted to a position of 0.1 mm from the deepest part of the slit, and the model electrolyzer was tightened by the tie rods 51r at 1.0 MPa to fabricate the model electrolyzer of Example 3. The model electrolyzer of Example 3 was subjected to the evaluation tests, except for the above-described measurements and repeated tightening test. The results are illustrated in Table 2.

Example 4

Using the gasket B described in Table 1, the diaphragm was inserted to a position of 0.1 mm from the deepest part of the slit, and the model electrolyzer was tightened by the tie rods 51r at 8.0 MPa to fabricate the model electrolyzer of Example 4. The model electrolyzer of Example 4 was subjected to the evaluation tests, except for the above-described measurements and repeated tightening test. The results are illustrated in Table 2.

Example 5

Using the gasket B described in Table 1, the diaphragm was inserted to a position of 2.5 mm from the deepest part of the slit, and the model electrolyzer was tightened by the tie rods 51r at 1.0 MPa to fabricate the model electrolyzer of Example 5. The model electrolyzer of Example 5 was subjected to the evaluation tests, except for the above-described measurements and repeated tightening test. The results are illustrated in Table 2.

Example 6

Using the gasket B described in Table 1, the diaphragm was inserted to a position of 2.5 mm from the deepest part of the slit, and the model electrolyzer was tightened by the tie rods 51r at 8.0 MPa to fabricate the model electrolyzer of Example 6. The model electrolyzer of Example 6 was subjected to the evaluation tests, except for the above-described measurements and repeated tightening test. The results are illustrated in Table 2.

Example 7

Using the gasket B described in Table 1, the diaphragm was inserted to a position of 7.0 mm from the deepest part of the slit, and the model electrolyzer was tightened by the tie rods 51r at 1.0 MPa to fabricate the model electrolyzer of Example 7. The model electrolyzer of Example 7 was subjected to the evaluation tests, except for the above-described measurements and repeated tightening test. The results are illustrated in Table 2.

Example 8

Using the gasket B described in Table 1, the diaphragm was inserted to a position of 7.0 mm from the deepest part of the slit, and the model electrolyzer was tightened by the tie rods 51r at 8.0 MPa to fabricate the model electrolyzer of Example 8. The model electrolyzer of Example 8 was subjected to the evaluation tests, except for the above-described measurements and repeated tightening test. The results are illustrated in Table 2.

Example 9

Using the gasket F described in Table 1, the diaphragm was inserted to a position of 7.0 mm from the deepest part of the slit, and the model electrolyzer was tightened by the tie rods 51r at 0.2 MPa to fabricate the model electrolyzer of Example 9. The model electrolyzer of Example 9 was subjected to the evaluation tests, except for the above-described measurements and repeated tightening test. The results are illustrated in Table 2.

Example 10

Using the gasket B described in Table 1, the diaphragm was inserted to a position of 0.1 mm from the deepest part of the slit, and the model electrolyzer was tightened by the tie rods 51r at 14.0 MPa to fabricate the model electrolyzer of Example 10. The model electrolyzer of Example 10 was subjected to the evaluation tests, except for the above-described measurements and repeated tightening test. The results are illustrated in Table 3.

Example 11

Using the gasket G described in Table 1, the diaphragm was inserted to a position of 2.5 mm from the deepest part of the slit, and the model electrolyzer was tightened by the tie rods 51r at 8.0 MPa to fabricate the model electrolyzer of Example 11. The model electrolyzer of Example 11 was subjected to the evaluation tests, except for the above-described measurements and repeated tightening test. The results are illustrated in Table 3.

Example 12

Using the gasket H described in Table 1, the model electrolyzer was tightened by the tie rods 51r to fabricate the model electrolyzer of Example 12. The model electrolyzer of Example 12 was subjected to the above-described measurements and evaluation tests. The results are illustrated in Table 3. The in-tank leakage test illustrated in Table 3 indicates the result of the in-tank leakage test conducted after the repeated tightening test. The in-tank leakage test conducted after the repeated tightening test was passed, and the amount of protrusion of the gasket was evaluated as A.

Example 13

Using the gasket I described in Table 1, the model electrolyzer was tightened by the tie rods 51r to fabricate the model electrolyzer of Example 13. The model electrolyzer of Example 13 was subjected to the above-described measurements and evaluation tests. The results are illustrated in Table 3. The in-tank leakage test illustrated in Table 3 indicates the result of the in-tank leakage test conducted after the repeated tightening test. The in-tank leakage test conducted after the repeated tightening test was passed, and the amount of protrusion of the gasket was evaluated as B.

Example 14

Using the gasket J described in Table 1, the model electrolyzer was tightened by the tie rods 51r to fabricate the model electrolyzer of Example 14.

The model electrolyzer of Example 14 was subjected to the above-described measurements and evaluation tests. The results are illustrated in Table 3. The in-tank leakage test illustrated in Table 3 indicates the result of the in-tank leakage test conducted after the repeated tightening test. The in-tank leakage test conducted after the repeated tightening test was passed, and the amount of protrusion of the gasket was evaluated as A.

Comparative Example 1

Using the gasket C described in Table 1, the diaphragm was inserted to a position of 7.0 mm from the deepest part of the slit, and the model electrolyzer was tightened by the tie rods 51r at 1.0 MPa to fabricate the model electrolyzer of Comparative Example 1. The model electrolyzer of Comparative Example 1 was subjected to the evaluation tests, except for the above-described measurements and repeated tightening test. The results are illustrated in Table 3.

Comparative Example 2

Using the gasket D described in Table 1, the diaphragm was inserted to a position of 0.1 mm from the deepest part of the slit, and the model electrolyzer was tightened by the tie rods 51r at 1.0 MPa to fabricate the model electrolyzer of Comparative Example 2. The model electrolyzer of Comparative Example 2 was subjected to the evaluation tests, except for the above-described measurements and repeated tightening test. The results are illustrated in Table 3.

Comparative Example 3

Using the gasket E described in Table 1, the diaphragm was inserted to a position of 7.0 mm from the deepest part of the slit, and the model electrolyzer was tightened by the tie rods 51r at 2.0 MPa to fabricate the model electrolyzer of Comparative Example 3. The model electrolyzer of Comparative Example 3 was subjected to the evaluation tests, except for the above-described measurements and repeated tightening test. The results are illustrated in Table 3.

REFERENCE SIGNS LIST

1 partition wall
2 electrode
2a anode
2c cathode
2e conductive elastic body
2r current collector
3 outer frame
3dp recessed portion
3sp gas-liquid separation box
3w wall portion
4 diaphragm
5 electrode chamber
5a anode chamber
5ai anode electrolytic solution inlet
5ao anode electrolytic solution outlet
5c cathode chamber
5ci cathode electrolytic solution inlet
5co cathode electrolytic solution outlet
6 rectifier plate (electrode rib)
6a anode rectifier plate (anode rib)
6c cathode rectifier plate (cathode rib)
7 gasket
71c lock portion
7p protrusion portion
7p1 first protrusion portion
7p2 second protrusion portion
100ai anode inlet-side hose
100ao anode outlet-side hose
100ci cathode inlet-side hose
100co cathode outlet-side hose
50 alkaline water electrolyzer
51a anode terminal element (element)
51c cathode terminal element (element)
51g fast head, loose head
51i insulating plate
51r tie rod
60 bipolar terminal element (element)
65 electrolytic cell
70 electrolysis apparatus
71 tubing pump
72h hydrogen separation tank (gas-liquid separation tank)
72o oxygen separation tank (gas-liquid separation tank)
73 water replenisher
74 rectifier
75 oxygen concentration meter
76 hydrogen concentration meter
77 flow meter
78 pressure gauge
79 heat exchanger
80 pressure control valve
IS inner peripheral surface
PI pressure gauge
SL slit
th through hole
VL vessel
Z zero-gap structure

The invention claimed is:

1. An alkaline water electrolyzer comprising:
at least two outer frames stacked so as to overlap at least in part in a circumferential direction;
a gasket sandwiched between the two outer frames, the gasket having a shape of a frame capable of being in contact with the outer frames over the entire circumferential direction, a slit being formed in an inner peripheral surface of the gasket along a circumferential direction, the gasket having a first protrusion portion that protrudes over the entire circumferential direction at a position overlapping the slit when viewed from a thickness direction of the slit; and
a diaphragm caught in the slit of the gasket such that a void is created between a bottom of the slit and an end of the diaphragm, wherein
a volume ratio (B1/A1) of volume B1 of the first protrusion portion to volume A1 of the void between the bottom of the slit and the end of the diaphragm, in a state of being released from being pressed in a thickness direction of the gasket, is between 0.5 and 100 inclusive.

2. The alkaline water electrolyzer according to claim 1, wherein a volume change ratio {(B1−B2)/B1} of volume B2 of the first protrusion portion in a state of being sandwiched between the two outer frames, to the volume B1 of the first protrusion portion in a state of being released from being sandwiched between the two outer frames, is between 0.5 and 1.0 inclusive.

3. The alkaline water electrolyzer according to claim 1, wherein a first volume change ratio ((A1−A2)/A1) of volume A2 of the void between the bottom of the slit and the end of the diaphragm in a state of being sandwiched between the two outer frames, to the volume A1 of the void between the bottom of the slit and the end of the diaphragm in a state of being released from being sandwiched between the two outer frames, is between 0.5 and 1.0 inclusive.

4. The alkaline water electrolyzer according to claim 3, wherein a second volume change ratio ((B1−B2)/B1) of volume B2 of the first protrusion portion in a state of being sandwiched between the two outer frames, to the volume B1 of the first protrusion portion in a state of being released from being sandwiched between the two outer frames, is between 0.5 and 1.0 inclusive.

5. The alkaline water electrolyzer according to claim 4, wherein a ratio [(B1−B2)/B1]/[(A1−A2)/A1] of the second volume change ratio to the first volume change ratio is between 0.5 and 1.0 inclusive.

6. The alkaline water electrolyzer according to claim 1, wherein the gasket has a second protrusion portion that protrudes at a position outside the slit when viewed from the thickness direction of the slit.

7. The alkaline water electrolyzer according to claim 6, wherein a volume change ratio {(C1−C2)/C1} of volume C2 of the second protrusion portion in a state of being sandwiched between the two outer frames, to volume C1 of the second protrusion portion in a state of being released from being sandwiched between the two outer frames, is between 0.5 and 1.0 inclusive.

8. The alkaline water electrolyzer according to claim 1, wherein the outer frames each have a gas-liquid separation box including a wall portion that forms a same plane as a surface contacting the gasket in part in the circumferential direction, and when a frame of the gasket is overlaid on the outer frames in the entire circumferential direction and the outer frames are pressed against the gasket at 2 MPa, an amount of deflection of the wall portion in the thickness direction of the gasket is 0.3 mm or less.

9. The alkaline water electrolyzer according to claim 1, wherein one of the two outer frames has at least an anode that is in contact with the diaphragm, and the other of the two outer frames has at least a cathode that is in contact with the diaphragm.

10. The alkaline water electrolyzer according to claim 1, wherein a thickness of the gasket is more than 0.5 mm and 10 mm or less.

11. The alkaline water electrolyzer according to claim 1, wherein a thickness of the slit is between 0.1 mm and 1 mm inclusive.

12. The alkaline water electrolyzer according to claim 1, wherein the diaphragm is a porous membrane.

13. The alkaline water electrolyzer according to claim 1, wherein a thickness of the diaphragm is between 0.1 mm and 1 mm inclusive.

14. The alkaline water electrolyzer according to claim 1, wherein the gasket has, at least in part, a lock portion for at least one of the outer frames.

15. The alkaline water electrolyzer according to claim 14, wherein a width of the lock portion is larger than a length of the lock portion.

16. The alkaline water electrolyzer according to claim 1, wherein pressing surface pressure of the gasket by the outer frames is between 1 MPa and 10 MPa inclusive, and maximum contact surface pressure between the gasket and the diaphragm is between 3 MPa and 20 MPa inclusive.

* * * * *